(12) United States Patent
Horita et al.

(10) Patent No.: US 7,880,899 B2
(45) Date of Patent: Feb. 1, 2011

(54) THREE-DIMENSIONAL MEASUREMENT SYSTEM, INSPECTION METHOD, THREE-DIMENSIONAL MEASUREMENT METHOD AND PROGRAM

(75) Inventors: Shinichi Horita, Osaka (JP); Osamu Toyama, Kakogawa (JP); Koichi Fujiwara, Kobe (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 1236 days.

(21) Appl. No.: 11/338,557

(22) Filed: Jan. 24, 2006

(65) Prior Publication Data

US 2006/0165275 A1 Jul. 27, 2006

(30) Foreign Application Priority Data

Jan. 26, 2005 (JP) ............................. 2005-018543
Jan. 28, 2005 (JP) ............................. 2005-021813

(51) Int. Cl.
*G01B 11/14* (2006.01)
*G01B 11/24* (2006.01)

(52) U.S. Cl. ...................................... 356/608; 382/154
(58) Field of Classification Search ....................... None
See application file for complete search history.

(56) References Cited

U.S. PATENT DOCUMENTS

| | | | | |
|---|---|---|---|---|
| 5,621,807 A | * | 4/1997 | Eibert et al. | ............... 356/3.16 |
| 5,819,016 A | * | 10/1998 | Watanabe et al. | ........... 345/419 |
| 5,845,048 A | * | 12/1998 | Masumoto | .................... 706/20 |
| 6,101,268 A | * | 8/2000 | Gilliland | ..................... 382/152 |
| 6,948,255 B2 | * | 9/2005 | Russell | ........................ 33/503 |
| 2002/0150288 A1 | * | 10/2002 | Fujiwara | ..................... 382/154 |

FOREIGN PATENT DOCUMENTS

| JP | 07225121 A | * | 8/1995 |
|---|---|---|---|
| JP | 8-190575 A | | 7/1996 |
| JP | 2000-306111 A | | 11/2000 |

OTHER PUBLICATIONS

Machine English translation of JP-H07-225121 (Oyama) from http://www.ipdl.inpit.go.jp/homepg_e.ipdl Sep. 20, 2009.*

* cited by examiner

*Primary Examiner*—Gregory J Toatley
*Assistant Examiner*—Juan D Valentin
(74) *Attorney, Agent, or Firm*—Sidley Austin LLP

(57) ABSTRACT

A three-dimensional measurement system comprises: a three-dimensional measuring device for obtaining measurement data related to the three-dimensional shape of a target object for measurement; a specification part for specifying a primitive of the target object based on annotation information contained in CAD data; and a controller for controlling the three-dimensional measuring device based on the primitive specified by the specification part.

19 Claims, 24 Drawing Sheets

FIG. 4

| NAME OF ANNOTATION INFORMATION | TYPE | FIRST ELEMENT | SECOND ELEMENT | DESIGN VALUE (mm) | POSITIVE TOLERANCE (mm) | NEGATIVE TOLERANCE (mm) |
|---|---|---|---|---|---|---|
| S | SURFACE-TO-SURFACE DISTANCE | PLANE Pa | PLANE Pb | 100 | +0.5 | -0.5 |

FIG. 9

| NAME OF ANNOTATION INFORMATION | TYPE | FIRST ELEMENT | SECOND ELEMENT | DESIGN VALUE (mm) | POSITIVE TOLERANCE (mm) | NEGATIVE TOLERANCE (mm) |
|---|---|---|---|---|---|---|
| Rc | CYLINDER'S DIAMETER | CYLINDER'S SIDE SURFACE Sc | | 30 | 0 | −0.2 |

F I G . 1 4

| NAME OF ANNOTATION INFORMATION | TYPE | FIRST ELEMENT | SECOND ELEMENT | DESIGN VALUE (mm) | POSITIVE TOLERANCE (mm) | NEGATIVE TOLERANCE (mm) |
|---|---|---|---|---|---|---|
| R h | DIAMETER OF HOLE | PLANE Ph | | 20 | +0.2 | 0 |

THREE-DIMENSIONAL MEASUREMENT SYSTEM, INSPECTION METHOD, THREE-DIMENSIONAL MEASUREMENT METHOD AND PROGRAM

This application is based on application Nos. 2005-018543 and 2005-021813 filed in Japan, the contents of which are hereby incorporated by reference.

BACKGROUND OF THE INVENTION

1. Field of the Invention

The present invention relates to a three-dimensional measurement system and techniques involved therein.

2. Description of the Background Art

In order to judge whether dimensions of a finished material are in conformity with requested dimensions (design dimensions), for example, a three-dimensional measurement system may be employed. Using the three-dimensional measurement system, the processing accuracy and the like of a finished material can be precisely inspected on the basis of the result of measurement of the three-dimensional shape of a target object for measurement.

As an example, there exists a three-dimensional measurement system using images which employs light sectioning method. According to the light sectioning method, on the basis of a captured image of a target object irradiated with applied laser beams, three-dimensional positions are obtained at each point in this captured image upon the principle of triangulation. The three-dimensional measurement system includes contact type measurement system in which a target object for inspection is contacted for example by a probe to measure the shape of the target object for inspection. On the other hand, a three-dimensional measurement system using images, which is a non-contact type measurement system, has various advantages over the contact type measurement system.

However, in the inspection employing the three-dimensional measurement system using images, an operator of this measurement system is required to decide the position and posture of a measuring part including a camera and the like on a trial and error basis. This results in insufficient operability of this three-dimensional measurement system.

In the inspection employing the foregoing three-dimensional measurement system, data related to a part to be subjected to the inspection is selected from all measurement data related to a target object for measurement, and then dimensions of the target part for the inspection are obtained using the selected data.

However, such inspection suffers from the difficulty in extracting data for use in the inspection from all measurement data related to a target object for measurement. By way of example, an operator may manually specify data on an operation screen. This troubles the operator to result in insufficient operability of the three-dimensional measurement system.

SUMMARY OF THE INVENTION

It is a first object of the present invention to provide a technique capable of easily deciding the position and posture for measurement during three-dimensional measurement while enhancing the operability in the three-dimensional measurement.

A second object of the present invention is to provide a technique capable of realizing easy inspection by means of three-dimensional measurement.

In order to achieve the first object, a three-dimensional measurement system comprises: a three-dimensional measuring device for obtaining measurement data related to the three-dimensional shape of a target object for measurement; a specification part for specifying a primitive of the target object based on annotation information contained in CAD data; and a controller for controlling the three-dimensional measuring device based on the primitive specified by the specification part.

Thus the position and posture during measurement can be easily decided to enhance the operability in the three-dimensional measurement.

In order to achieve the second object, a three-dimensional measurement system comprises: a three-dimensional measuring device for obtaining measurement data related to the three-dimensional shape of a target object; a specification part for specifying a primitive of the target object based on annotation information contained in CAD data; and an inspection device for inspecting the dimension of the target object by using data selected from the measurement data and corresponding to the primitive specified by the specification part.

Thus data to be adapted for use in the inspection can be automatically decided to thereby easily perform inspection by means of the three-dimensional measurement.

The present invention is also intended for a three-dimensional measurement method, a method of inspection and a recording medium.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an exemplary data structure constituting annotation information;

FIG. 9 shows annotation information related to the member as a target object for inspection in the second preferred embodiment;

FIG. 14 shows annotation information related to the member as a target object for inspection in the third preferred embodiment;

DESCRIPTION OF THE PREFERRED EMBODIMENTS

1. First Preferred Embodiment

<Schematic System Configuration>

Figure 1:
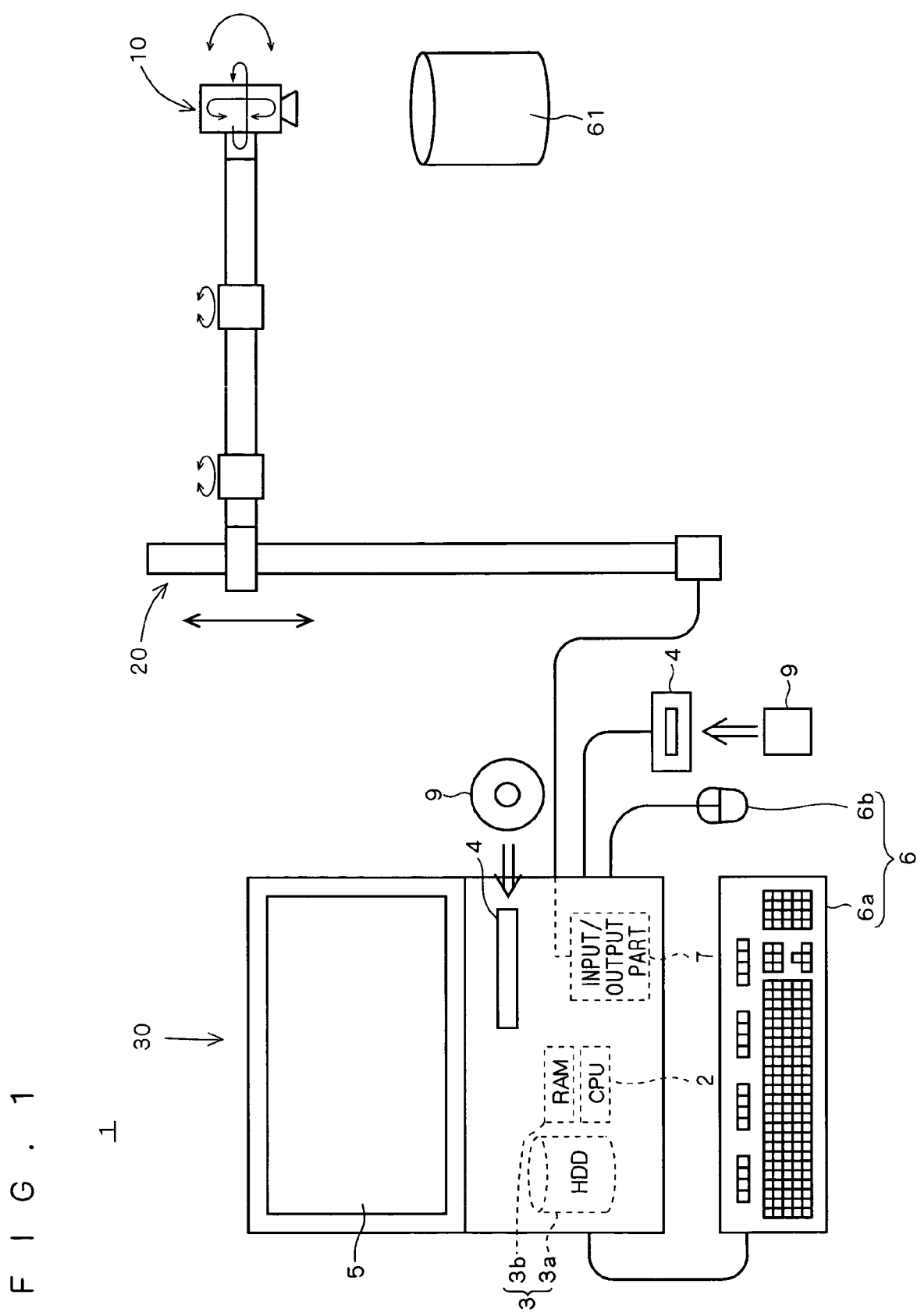
FIG. 1 is a schematic view of a three-dimensional measurement system.

FIG. 1 is a schematic view of a three-dimensional measurement system 1 according to a first preferred embodiment of the present invention. With reference to FIG. 1, the three-dimensional measurement system 1 comprises a measurement unit 10, a drive arm 20 and a controller 30.

The measurement unit 10 is a non-contact type three dimensional measurement unit, and more specifically, is a three-dimensional measurement unit using an image, which employs light sectioning method. According to the light sectioning method, on the basis of an image captured by an applied laser beam, data of a three-dimensional position of each point in this captured image is obtained upon the principle of triangulation. The measurement unit 10 includes a camera (CCD camera) 11, a laser light emission part 12 and a position calculation part 13 (see FIG. 2). In the measurement unit 10, slit-shaped laser light emitted from the laser light emission part 12 is applied to a target object for measurement. The light reflected therefrom is received at the camera 11 so that the camera 11 captures an image of the target object for measurement irradiated with this laser light. The position calculation part 13 calculates a distance from the target object at each point on a screen upon the principle of triangulation, thereby calculating the three-dimensional coordinate values of each point on the surface of the target object for measurement. The calculated three-dimensional coordinate values are sent to the controller 30. Three-dimensional coordinate values calculated at the position calculation part 13 are expressed in the camera coordinate system.

The measurement unit 10 is attached to an end portion of the drive arm 20. The drive arm 20 has several degrees of freedom and is capable of changing the position and posture of the measurement unit 10 provided at its end portion. More specifically, the drive arm 20 has one prismatic joint (slide joint) capable of being driven in a vertical direction, and two rotary joints capable of being driven in a horizontal direction, whereby the position of the measurement unit 10 can be arbitrarily changed within a certain range in three-dimensional space. The drive arm 20 further has a rotation driver having three degrees of freedom of rotation at its terminal portion, whereby the posture of the measurement unit 10 can be arbitrarily changed within a certain range. Thus the controller 30 is allowed to suitably set the position and posture of the measurement unit 10 for image capture. The position and posture of the drive arm 20 are controlled based on instructions given from the controller 30.

The controller 30 is configured as a computer system (also simply referred to as "computer" below). More specifically, this computer (controller) 30 comprises: a CPU 2; a storage part 3; a media drive 4; a display part 5 such as a liquid crystal display (LCD); an operation part 6 including a keyboard 6a, a mouse 6b and the like; and an input/output part 7 responsible for transfer of information to and from the measurement unit 10 and the drive arm 20. The storage part 3 includes a hard disk drive (HDD) 3a and a RAM (semiconductor memory) 3b. The media drive 4 is capable of reading information stored in a potable recording medium 9 which may be a flexible disk, memory card or the like.

The controller 30 reads a software program (also simply referred to as "program" below) PG (not shown) stored in the recording medium 9. Then the controller 30 causes the CPU 2 and the like to execute the program PG, to thereby realize various functions (such as measurement control) discussed below. The program PG realizing various functions is not necessarily supplied through the recording medium 9. Alternatively, the program PG may be supplied through a network such as a LAN or the Internet.

Figure 2:
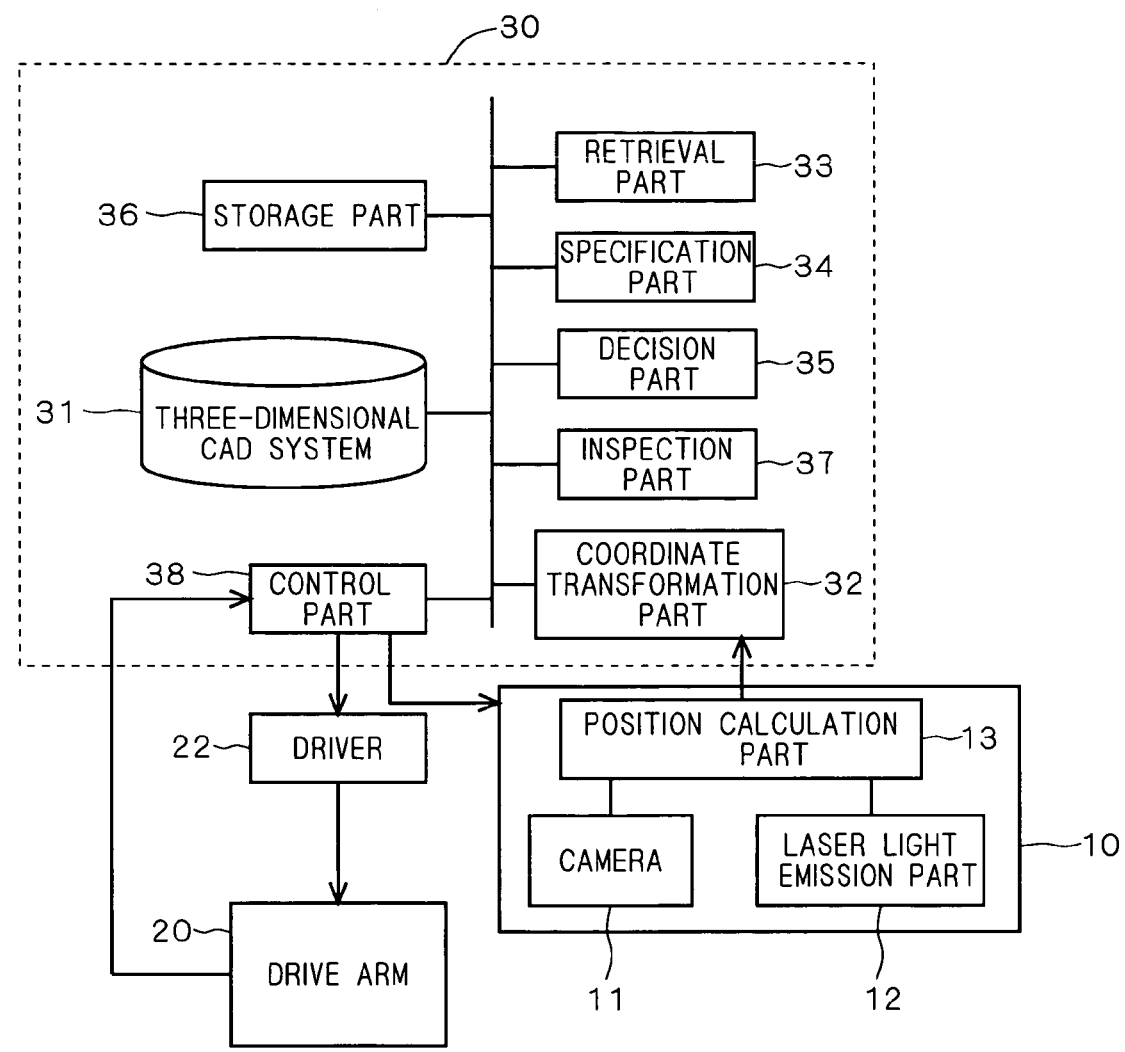
FIG. 2 shows a functional block of a controller.

FIG. 2 shows a functional block of the controller 30. With reference to FIG. 2, the controller 30 comprises a three-dimensional CAD system 31, a coordinate transformation part 32, a retrieval part 33, a specification part 34, a decision part 35, a storage part 36, an inspection part 37 and a control part 38.

Based on the three-dimensional coordinate values of a target object for measurement calculated at the position calculation part 13 of the measurement unit 10 and the relationship between the camera coordinate system and the base coordinate system, the controller 30 calculates three-dimensional coordinate values of the target object for measurement in the base coordinate system. The base coordinate system is a basic coordinate system fixed in space. The three-dimensional coordinate values of the target object for measurement in different camera coordinate systems captured in several positions and postures (by the measurement unit 10) are respectively transformed to values in the base coordinate system, whereby these three-dimensional coordinate values in the camera coordinate systems can be uniformly handled. The coordinate transformation part 32 in the controller 30 (FIG. 2) is responsible for this coordinate transformation. A group of three-dimensional coordinate values thereby obtained, namely, three-dimensional data, is stored in the storage part 36. Using the three-dimensional data of the target object for measurement thereby acquired and data in the three-dimensional CAD system 31, the inspection part 37 of the controller 30 determines whether the finished target object for measurement is in conformity with instructions at the design stage.

In the first preferred embodiment, the position and posture of the drive arm 20 at the time of measurement are suitably determined by the controller 30 on the basis of the information related to a target object for measurement (target object for inspection). More specifically, the retrieval part 33 of the controller 30 retrieves annotation information (discussed later) from the three-dimensional CAD system 31. Next, the specification part 34 specifies a primitive of a target object for measurement on the basis of the annotation information thereby retrieved. Then the decision part 35 decides the position and posture of the camera 11 such that a part of the target object for measurement corresponding to the specified primitive is defined as a target region for image capture.

The control part 38 serves to control the actuation of the drive arm 20 using a driver 22 as well as to control the measurement unit 10 (by sending control commands, for example).

It will be discussed in detail how the position and posture of the measurement unit 10 are decided. In the following, it is assumed that a cylindrical member 61 (see FIG. 5) is a target object for measurement to be subjected to the measurement of three-dimensional data to determine the acceptability of the member 61.

<Schematic Operation>

Figure 3:
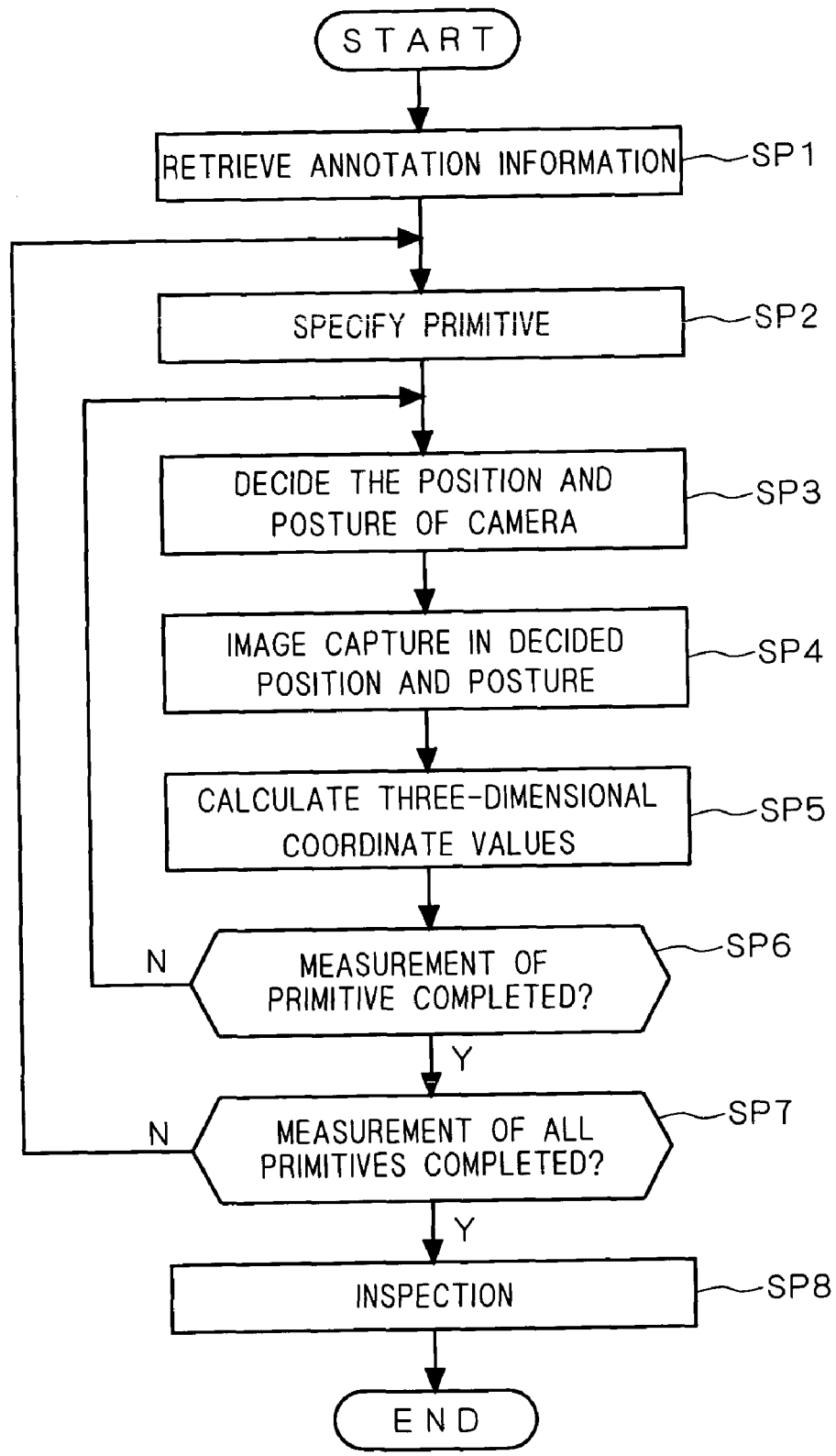
FIG. 3 is a flow chart showing how a target object for measurement is inspected.

FIG. 3 is a flow chart showing how a target object for measurement is inspected. The member 61 as a target object for measurement is fixedly arranged at a suitable position in the three-dimensional measurement system 1 by a certain holding member (not shown). An instruction given by an operator through the above-discussed operation part 6 and the like triggers the process flow starting with step SP1. For accurate measurement, calibration is preferably performed prior to step SP1 to obtain the correspondence between the arrangement of the target object for measurement and the three-dimensional CAD data. Here, pre-image capture is performed prior to step SP1 to adjust the actual arrangement of the target object for measurement to the coordinate system in the three-dimensional CAD data, whereby the position and posture of the target object for measurement are in conformity with predetermined position and posture in the CAD data. At this time, the actual positioning of the target object is not required. It is required only to obtain the correspondence between the arrangement of the target object for measurement and the three-dimensional CAD data. As a result of such calibration (establishment of a correlation between the coordinate systems), the three-dimensional measurement system 1 of the first preferred embodiment is allowed to more accurately understand the arrangement of the target object for measurement on the basis of the three-dimensional CAD data.

In the first preferred embodiment, the controller 30 uses "annotation information" to decide the position and posture of the measurement unit 10. The annotation information is contained in the three-dimensional CAD data, and includes dimensional information and tolerance information.

FIG. 4 shows an exemplary data structure constituting the annotation information. With reference to FIG. 4, the annotation information includes data classified in categories "name of annotation information", "type", "first element (primitive)", "second element (primitive)", "design value" (mm), "positive tolerance" (mm), and "negative tolerance" (mm).

The data in these categories respectively indicate "S" as the name of annotation information, "surface-to-surface distance" as the type, "plane Pa" as the first element, "plane Pb" as the second element, "100" as the design value (mm), "+0.5" as the positive tolerance (mm), and "−0.5" as the negative tolerance (mm). That is, it is seen that the annotation information shown in FIG. 4 relates to a distance between the planes Pa and Pb (surface-to-surface distance), while indicating that the design value of this surface-to-surface distance is 100 mm within tolerances of ±0.5 mm. In the first preferred embodiment, it is determined whether the distance between the plane Pa as the upper surface of the cylindrical member 61 and the plane Pb as the bottom surface (lower surface) falls within the above-discussed tolerances. More specifically, it is determined whether distances between points on the upper surface Pa and their corresponding points on the bottom surface Pb all fall within the above-discussed tolerances.

In many cases, such annotation information is entered as design information into the three-dimensional CAD system 31 at the design stage and the like. In this case, namely, when annotation information has already been entered at the design stage, for example, such annotation information is not required to be entered merely for the purpose of inspection.

In step SP1 (FIG. 3), the retrieval part 33 of the controller 30 retrieves the annotation information (see FIG. 4) related to the target object for measurement from the three-dimensional CAD data. Thereafter measurement is performed in relation to the annotation information thereby acquired, followed by inspection by comparing the result of measurement and design data. That is, it is determined by this retrieval what is to be inspected. Here, the annotation information shown in FIG. 4 is obtained to decide that the surface-to-surface distance S between the planes Pa and Pb is inspected.

Next, in step SP2, the specification part 34 of the controller 30 specifies a primitive (basic structure) of the target object for measurement on the basis of the annotation information S.

Figure 5:
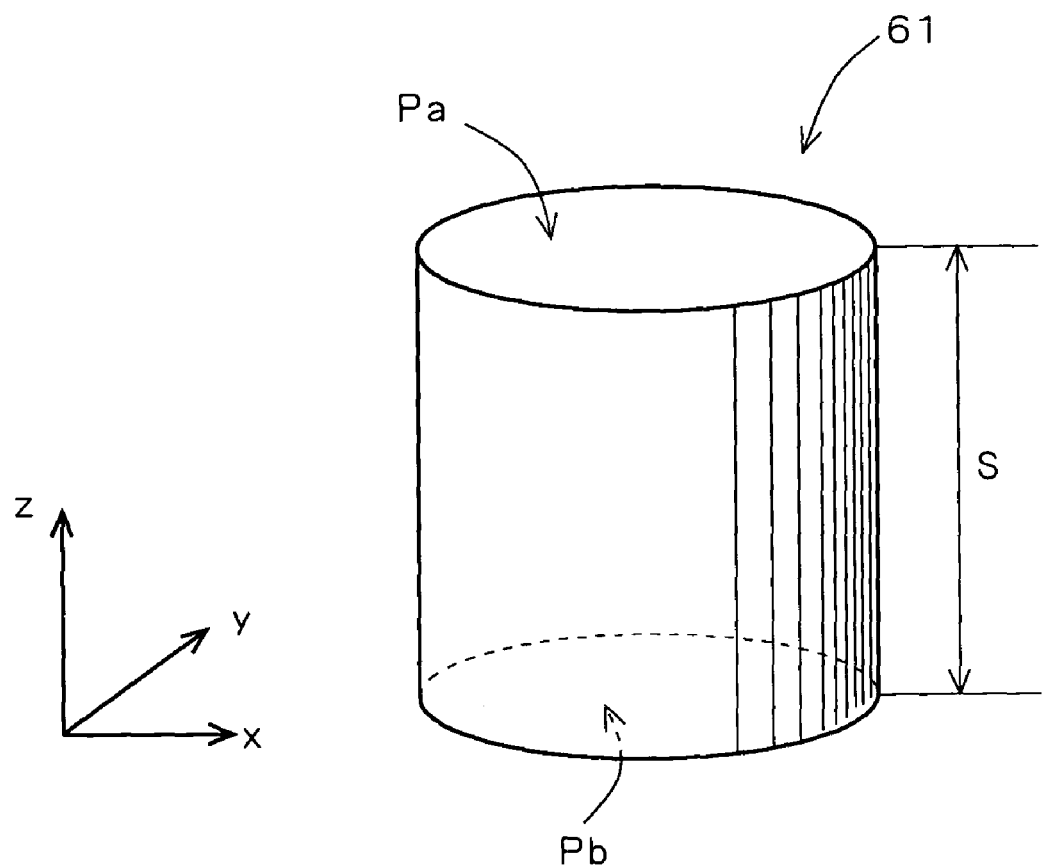
FIG. 5 is a perspective view of a cylindrical member.

With reference to FIGS. 4 and 5, the annotation information S includes two primitives, which are specifically the plane (upper surface) Pa and the plane (bottom surface) Pb of the member 61. Thus subsequent processes (steps SP3, SP4 and SP5) sequentially follow with respect to both of these primitives. Here, it is assumed that the plane Pa is specified as a first primitive.

In step SP3, the controller 30 decides the position and posture of the camera 11 such that the camera 11 is allowed to perform image capture with a part of the target object for measurement corresponding to the specified primitive coming within the field of view (within a screen).

Figure 6:
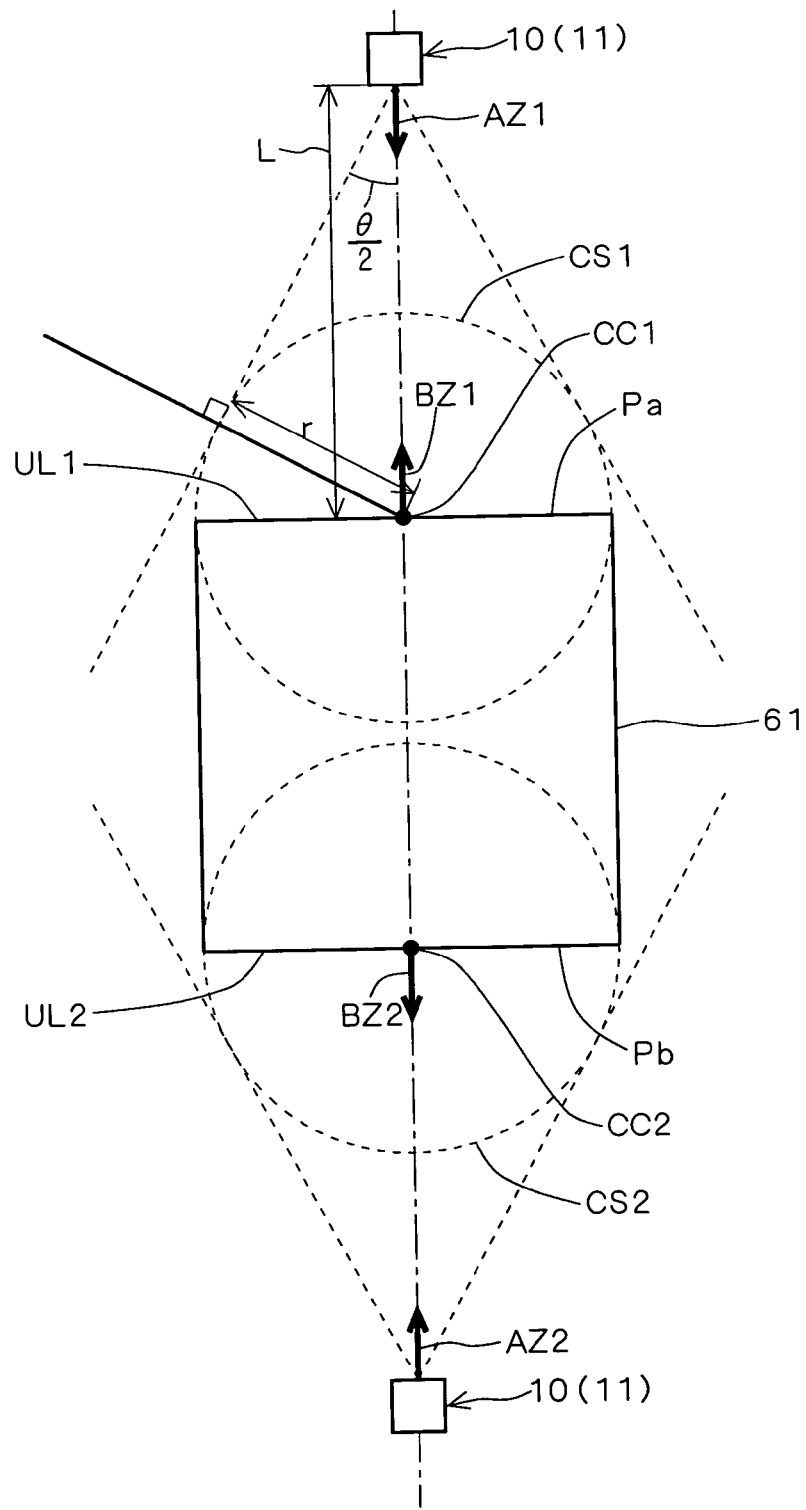
FIG. 6 is a conceptual view showing how the position and posture of a camera are decided.

FIG. 6 is a conceptual view showing how the position and posture of the measurement unit 10 (which is more specifically the camera 11) are decided. Here, the planes Pa and Pb of the member 61 are fixedly held in parallel with the floor as illustrated in FIG. 1. FIG. 6 is a side view showing the member 61 placed in this condition.

Assuming an inclusive sphere CS1 covering the plane Pa (more specifically, a reference line segment UL1 of the plane Pa), the decision part 35 of the controller 30 decides the position and posture of the camera 11 by using this inclusive sphere CS1. The inclusive sphere CS1 is a virtual sphere having a center coinciding with the center of the plane Pa in the shape of a circle (namely, the center of this circle), with a diameter corresponding to the dimension of the plane Pa in the horizontal direction of FIG. 6 (that is equivalent to the diameter of the circle of the plane Pa). The inclusive sphere CS1 is also expressed as a sphere covering the reference line segment UL1 having a dimension of the plane Pa in a predetermined direction.

First, the posture of the camera 11 is decided such that a center CC1 of the inclusive sphere CS1 is set as a fixation point (a center point of view). More specifically, the posture of the camera 11 at the time of measurement is decided such that a normal BZ1 passing through the center (centroid) CC1 of the plane Pa (in the shape of a circle) and a view axis AZ1 of the camera 11 are arranged on the same axis, and that the view axis AZ1 of the camera 11 is directed toward a target object for measurement. In other words, the posture of the camera 11 at the time of measurement of the plane Pa is decided such that the normal to the plane Pa at an intersection point of the view axis AZ1 and the plane Pa (here, the center CC1 of the plane Pa) is arranged in the same direction as the view axis AZ1.

The decision part 35 of the controller 30 also decides the position of the camera 11. More specifically, the position of the camera 11 is decided such that it is on the normal BZ1 passing through the center CC1 of the plane Pa, and that it allows a distance L between the camera 11 and the center of the inclusive sphere CS1 to satisfy the following formula:

$$L=r/\sin(\theta/2)$$

where $\theta$ is the angle of view of the camera 11, and r is the radius of the inclusive sphere CS1. The value obtained from this formula satisfies the geometric relationship expressed as $$r/L=r/\sin(\theta/2)$$

The angle of view $\theta$ is determined on the basis of the focal length of the camera 11 and the like to fall within the range from 0 to 180 degrees.

The position and posture thereby decided allow a target object for measurement to precisely come within the field of view of the camera 11. Particularly, the position and posture of the camera 11 are decided such that the inclusive sphere CS1 precisely comes within the field of view of the camera 11 (more specifically, such that the inclusive sphere CS1 comes into contact with two opposing sides of four sides defining the field of view in the shape of a rectangle of the camera 11). Thus an image of the target object for measurement is captured with the plane Pa emphasized in the field of view of the camera 11. The plane Pa of the target object for measurement is also expressed as a part corresponding to a primitive that is specified first.

Thereafter in step SP4, the controller 30 obtains target values of the amounts of drive of joints to realize the position and posture decided in step SP3, and sends an instruction to the drive arm 20 to realize these target values. When the target values are realized, the measurement unit 10 performs three-dimensional measurement. More specifically, in the measurement unit 10, laser light emitted from the laser light emission part 12 is applied to the target object for measurement, and the light reflected therefrom is received at the camera 11 to capture an image of the target object for measurement.

Thereafter the measurement unit 10 calculates three-dimensional coordinate values on the surface of the target object for measurement according to the light sectioning method, thereby obtaining the three-dimensional coordinate values of each lattice point on the plane Pa (step SP5).

The three-dimensional coordinate values thereby calculated are sent to the controller 30, at which the coordinate transformation part 32 translates the three-dimensional coordinate values from the camera coordinate system to the base coordinate system. The coordinate values transformed into the base coordinate system are stored in the storage part 36 of the controller 30.

The measurement related to the first primitive Pa is thereby completed.

When it is determined that the measurement regarding the first primitive is completed (step SP6) and that there is another primitive remaining unmeasured (step SP7), the flow returns to step SP2 to specify the plane Pb as a second primitive to be subjected to the processing. Then the plane Pb as the second primitive is subjected to measurement and the like in the same manner (steps SP3, SP4 and SP5).

For the measurement of the plane Pb, the camera 11 moves to a position below the member 61 as shown in FIG. 6 More specifically, the position of the camera 11 at the time of measurement of the plane Pb is decided such that it is on an outward normal BZ2 passing through a center CC2 of the plane Pb, and that it allows a distance L between the camera 11 and the center of an inclusive sphere CS2 to satisfy the following formula:

$$L=r/\sin(\theta/2)$$

where $\theta$ is the angle of view of the camera 11, and r is the radius of the inclusive sphere CS2. The posture of the camera 11 at the time of measurement of the plane Pb is decided such that the normal to the plane Pb at the intersection point of a view axis AZ2 of the camera 11 and the plane Pb (here, the center of the plane Pb CC2) is arranged in the same direction as the view axis AZ2. The inclusive sphere CS2 is a virtual sphere having a center coinciding with the center CC2 of the plane Pb in the shape of a circle, and covering a reference line segment UL2 corresponding to the dimension of the plane Pb in the horizontal direction of FIG. 6

The position and posture thereby decided allow a target object for measurement to precisely come within the field of view of the camera 11. Further, an image of the target object for measurement is captured with the plane Pb emphasized in the field of view of the camera 11. The plane Pb of the target object for measurement is also expressed as a part corresponding to a primitive that is specified second.

When it is determined (in step SP7) that the three-dimensional data is obtained related to both primitives (namely, the planes Pa and Pb), the flow proceeds to inspection (step SP8). Data included in the annotation information S, more specifically, data about the design value and tolerance, is adapted for use in this inspection.

Figure 7:
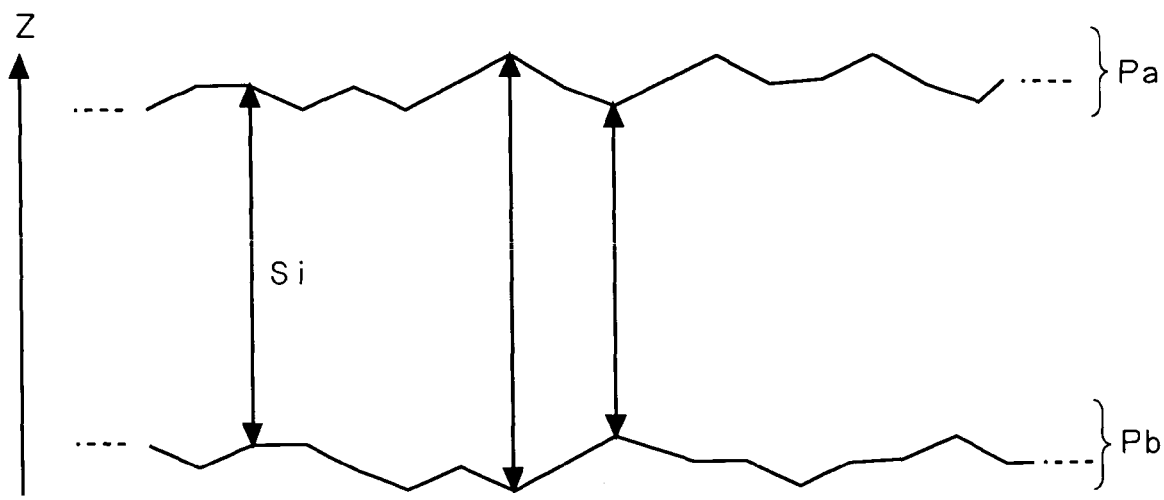
FIG. 7 is a conceptual view showing three-dimensional data obtained by measurement.

FIG. 7 is a conceptual view showing three-dimensional data obtained by measurement. In FIG. 7, points on the upper surface Pa and points on the bottom surface Pb are respectively arranged in the horizontal direction of FIG. 7. The vertical direction defined in FIG. 7 corresponds to the direction of the Z axis (the direction of height of the cylinder).

The inspection part 37 of the controller 30 makes comparison between the Z-coordinate of each point on the upper surface Pa and the Z-coordinate of a corresponding point on the bottom surface Pb to obtain a difference Si therefrom in Z-coordinate. When it is determined that all the differences Si fall within tolerance limits with respect to the design value, the surface-to-surface distance S of the member 61 is judged as being acceptable. More specifically, when the differences Si all satisfy the following formula, the surface-to-surface distance S is judged as being acceptable:

$$100.0-0.5 \leq Si \leq 100.0+0.5$$

The inspection of the surface-to-surface distance S between the upper surface Pa and the bottom surface Pb is thereby realized. The surface-to-surface distance S may be inspected by an alternative manner. As an example, approximate surfaces APa and APb employed in a fourth preferred embodiment described later may also be applied for use in the first preferred embodiment (see FIG. 22 and the like).

In the first preferred embodiment, based on the annotation information S contained in the three-dimensional CAD data, primitives (planes Pa and Pb) of a target object for measurement are specified (step SP2). The position and posture of the camera 11 are automatically decided such that parts of the target object for measurement corresponding to the specified primitives are set as target regions for image capture (step SP3). That is, a part to be actually subjected to measurement is suitably selected from the target object for measurement, and the position and posture for capturing an image of this part are automatically decided. Thus the position and posture at the time of measurement can be easily decided to enhance the operability in the three-dimensional measurement.

In the first preferred embodiment, the diameter of an inclusive sphere is set at a design value of the diameter of the plane Pa in the shape of a circle. Alternatively, the diameter of the inclusive sphere may be set greater than the design value allowing for a tolerance α (within a range of about a few percent of the design value, for example), and more directly, may be set slightly greater than the design value. That is, the position and posture of the camera 11 may be decided by using an inclusive sphere covering a reference line segment having a dimension including a dimension of the plane Pa in a predetermined direction (namely, the diameter of the circle of the plane Pa) and the tolerance α for adjustment.

Second Preferred Embodiment

In the first preferred embodiment described above, the surface-to-surface distance of a member in the shape of a cylinder is subjected to inspection. In a second preferred embodiment of the present invention, the diameter of a cylindrical member is subjected to inspection. More specifically, using the three-dimensional coordinate values of each point on the side surface of the cylinder, it is determined whether the diameter of each section orthogonal to the central axis of the finished cylindrical member satisfies a predetermined condition.

The three-dimensional measurement system according to the second preferred embodiment is substantially the same in configuration as the three-dimensional measurement system of the first preferred embodiment. In the following, differences from the first preferred embodiment will be mainly discussed.

Figure 8:
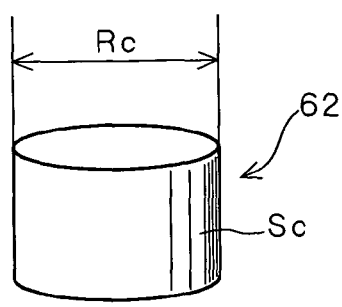
FIG. 8 shows a member as a target object for inspection in a second preferred embodiment of the present invention.

FIG. 8 shows a member 62 as a target object for inspection in the second preferred embodiment. FIG. 9 shows annotation information related to the member 62 that is entered at the design stage.

The annotation information shown in FIG. 9 indicates "Rc" as the name of annotation information, "cylinder's diameter" as the type, "cylinder's side surface Sc" as the first element, "none" as the second element, "30" as the design value (mm), "+0" as the positive tolerance (mm), and "−0.2" as the negative tolerance (mm). That is, it is seen that the annotation information shown in FIG. 9 relates to the diameter of a cylinder having the side surface Sc, while indicating that the design value of this diameter is 30 mm within tolerances of +0 and −0.2 mm.

Next, the operation in the second preferred embodiment will be discussed also referring to the flow chart of FIG. 3.

In step SP1 (FIG. 3), the retrieval part 33 of the controller 30 retrieves the annotation information related to a target object for measurement from the three-dimensional CAD data. Here, the annotation information Rc shown in FIG. 9 is obtained to determine that the diameter Rc of a cylinder having the side surface Sc is inspected.

Next, in step SP2, the specification part 34 of the controller 30 specifies a primitive of the target object for measurement on the basis of the annotation information Rc. With reference to FIG. 9, the annotation information Rc includes one primitive, which is specifically the cylinder's side surface Sc. The cylinder's side surface Sc is specified as a primitive.

In step SP3, the controller 30 decides the position and posture of the camera 11 such that the camera 11 is allowed to perform image capture with a part of the target object for measurement corresponding to the specified primitive coming within the screen.

Figure 10:
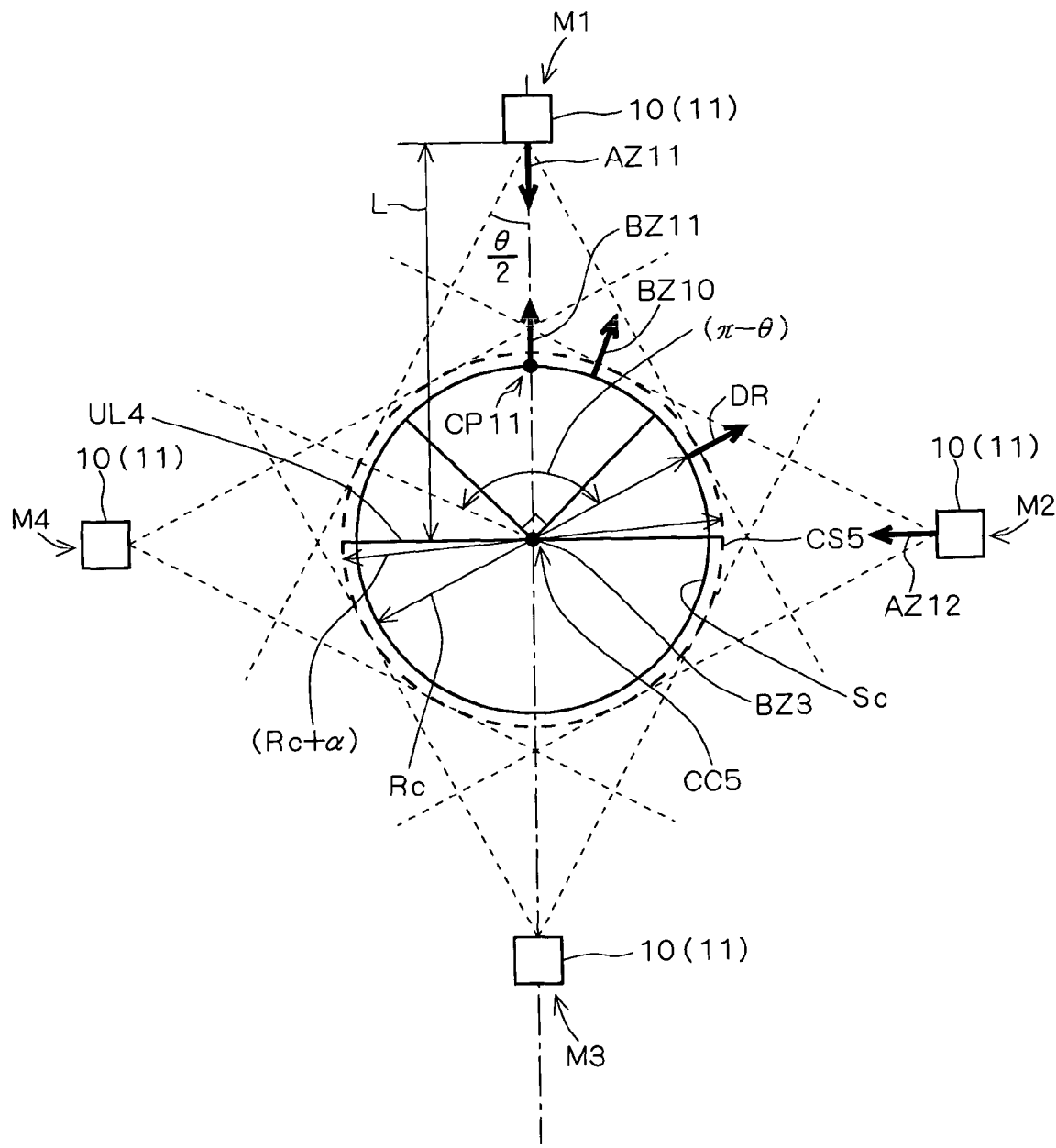
FIG. 10 is a conceptual view showing how the position and posture of the camera are decided in the second preferred embodiment.

FIG. 10 is a conceptual view showing how the position and posture of the camera 11 are decided. Here, it is assumed that the upper and bottom surfaces of the cylindrical member as a target object for measurement are fixedly held-in parallel with the floor as illustrated in FIG. 1. FIG. 10 is a top view showing the member placed in this condition.

Figure 11:
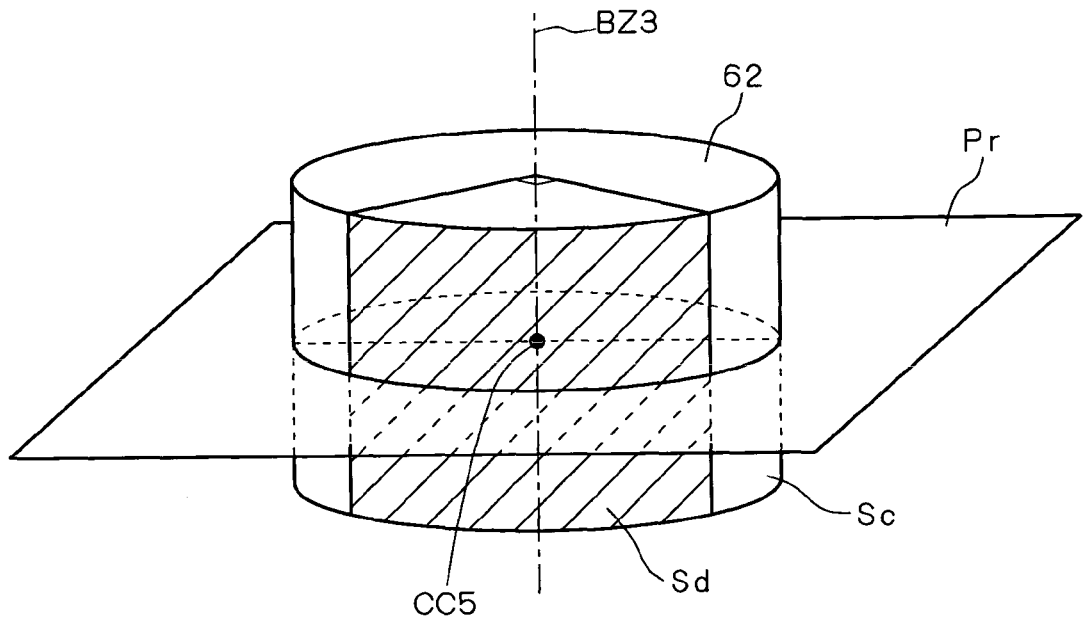
FIG. 11 shows a measurable range in some position and posture.

The decision part 35 of the controller decides to capture an image of the cylinder's side surface from the side. The decision part 35 further decides the position and posture of the camera 11 at the time of measurement. More specifically, assuming an inclusive sphere CS5 covering the cylinder's side surface Sc as a primitive (which is more particularly a reference line segment UL4 of the cylinder's side surface Sc), the position and posture of the camera 11 are decided such that the inclusive sphere CS5 comes within the field of view of the camera 11. The inclusive sphere CS5 is a sphere having a center CC5 and a diameter to be described below. With reference to FIG. 11, the center CC5 is an intersection point of a central axis BZ3 of a cylinder having the side surface Sc and a plane Pr dividing this cylinder into two in the direction of height.

In the second preferred embodiment, the cylinder's diameter (the diameter of the upper surface of the cylinder) Rc is not directly applied for use as the diameter of the inclusive sphere CS5. Assuming that the reference line segment UL4 has a dimension (Rc+α) given by adding the value α for adjustment to the cylinder's diameter Rc, this dimension of the reference line segment UL4 is applied as the diameter of the inclusive sphere CS5. The value α for adjustment is given to provide margin for the side surface region of the cylinder on the screen, within the range of not less than 0 and not more than a few percent of the diameter Rc. That is, the inclusive sphere CS5 covers the reference line segment UL4 with a dimension corresponding to the cylinder's diameter Rc plus the value α for adjustment. The inclusive sphere CS5 is also expressed as a virtual sphere having a diameter equivalent to the reference line segment UL4. The cylinder's diameter Rc is also expressed as a dimension of the cylinder (of the upper surface of the cylinder) in a horizontal direction when the cylinder is viewed from the side.

The measurement of the cylinder's side surface is accompanied by image capture of the side surface from the side, meaning that the side surface at the opposite side cannot be subjected to image capture, namely, measurement. In response, in the second preferred embodiment, measurement is repeatedly performed by a plurality of measuring displacements (here, four measuring displacements M1 through M4) of the camera 11 to obtain the three-dimensional coordinate values of each point on the side surface Sc of the cylinder in its entirety. Here, the measuring displacements M1 through M4 each include a position and a posture. In other words, the inclusive sphere CS5 when viewed from above is divided into a plurality of segments (here, four segments each having a central angle of 90 degrees). The position and posture of the camera 11 are decided for each segment to thereby perform image capture several times (four times).

First, the first measuring displacement MI of the camera 11 is decided. More specifically, the posture of the camera 11 is decided such that the center CC5 of the inclusive sphere CS5 is set as a fixation point (a center point of view). In more detail, the posture of the camera 11 is decided such that, a normal BZ11 to the cylinder's side surface Sc at an intersection point CP11 of a view axis AZ11 of the camera 11 and the cylinder's side surface Sc is arranged in the same direction as the view axis AZ11. The position of the camera 11 is decided such that a distance L between the camera 11 and the center CC5 of the inclusive sphere CS5 satisfies the following formula:

$$L = r/\sin(\theta/2)$$

where θ is the angle of view of the camera 11, and r is the radius of the inclusive sphere CS5. The position of the first measuring displacement M1 is set at any position satisfying this formula, more specifically, at any position on a circle as an intersection of the plane Pr and the inclusive sphere CS5.

A subsequent step is measurement and the like by the first measuring displacement M1. More specifically, the drive arm 20 is driven to realize the first measuring displacement M1, and thereafter three-dimensional measurement is performed by the measurement unit 10 (step SP4). Then the measurement unit 10 calculates three-dimensional coordinate values on the surface of the target object for measurement according to the light sectioning method. Then the controller 30 translates the three-dimensional coordinate values sent from the measurement unit 10 from the camera coordinate system to the base coordinate system, and stores the transformed three-dimensional coordinate values (step SP5).

With reference to FIG. 10, according to the image capture by the first measuring displacement MI, an image of a part of the cylinder's side surface Sc included in the capture range of the angle of view θ (side surface region defined by an arc corresponding to a central angle (180−θ)) is captured. In a peripheral part of the cylinder's side surface Sc, a large angle is formed between a surface normal DR to this peripheral part and the view axis AZ11 of the camera 11, resulting in a reduced degree of accuracy of data. Thus it is preferable to define only a partial region of the screen excluding the peripheral part as a measurable region.

In the second preferred embodiment, the position and posture of the camera 11 are decided to define a part of the cylinder's side surface (non-planar surface) as a target region for measurement by one image capture operation. Here, a normal BZ10 to this part of the cylinder's side surface forms an angle of not more than a certain value (here, 45 degrees) with the view axis AZ11 of the camera 11. In the present invention, the angle between two straight lines is expressed in the range of 0 to 90 degrees. The decision of the position and posture of the camera 11 is also expressed as definition of a side surface region Sd (see FIG. 11) with an arc corresponding to a predetermined angle smaller than the central angle (180−θ) as a measurable region. As an example, assuming that θ=60 degrees, the side surface region Sd (see FIG. 11) corresponding to the central angle of 90 degrees that is smaller than 120 degrees (=180−60) is defined as a measurable region.

As a result, the three-dimensional data of the side surface region (diagonally shaded region in FIG. 11) Sd corresponding to a quarter of the cylinder's side surface Sc in its entirety is acquired.

When it is determined that the measurement regarding this primitive is not completed (step SP6), the flow returns to step SP3.

In step SP3, next position and posture, namely, the second measuring displacement M2 of the camera 11 is decided. The "position" of the second measuring displacement M2 is obtained by rotating the camera 11 clockwise on the plane Pr to a predetermined angle (here, 90 degrees) with respect to the center CC5. The "posture" of the second measuring displacement M2 is obtained such that a new view axis AZ12 of the camera 11 is also directed toward the center CC5 of the inclusive sphere CS5. In other words, the second measuring displacement M2 is obtained by rotating the camera 11 from the first measuring displacement M1 to 90 degrees with respect to the center CC5 while maintaining the same relationship with the center CC5 as the first measuring displacement M1. The distance L between the camera 11 and the inclusive sphere CS5 is the same in the first and second measuring displacements M1 and M2.

Subsequent steps SP4 and SP5 are measurement and the like by the second measuring displacement M2. When it is determined that the measurement regarding this primitive is not completed (step SP6), the flow returns to step SP3.

In step SP3, next position and posture, namely, the third measuring displacement M3 of the camera 11 is decided. The third measuring displacement M3 is obtained by rotating the camera 11 from the first measuring displacement M1 to 180 degrees with respect to the center CC5 while maintaining the same relationship with the center CC5 as the first measuring displacement M1.

Subsequent steps SP4 and SP5 are measurement and the like by the third measuring displacement M3. When it is determined that the measurement regarding this primitive is not completed (step SP6), the flow returns to step SP3.

In step SP3, the last position and posture, namely, the fourth measuring displacement M4 of the camera 11 is decided. The fourth measuring displacement M4 is obtained by rotating the camera 11 from the first measuring displacement M1 to 270 degrees with respect to the center CC5 while maintaining the same relationship with the center CC5 as the first measuring displacement M1.

Subsequent steps SP4 and SP5 are measurement and the like by the fourth measuring displacement M4. When it is determined that the measurement regarding this primitive is completed (step SP6), the flow proceeds to step SP7. When it is determined that the measurement regarding this primitive (namely, the cylinder's side surface Sc) is completed in step SP7, the flow proceeds to step SP8 to perform inspection.

The inspection in step SP8 uses the data included in the annotation information, which is more particularly the data related to the design value and the tolerances.

Figure 12:
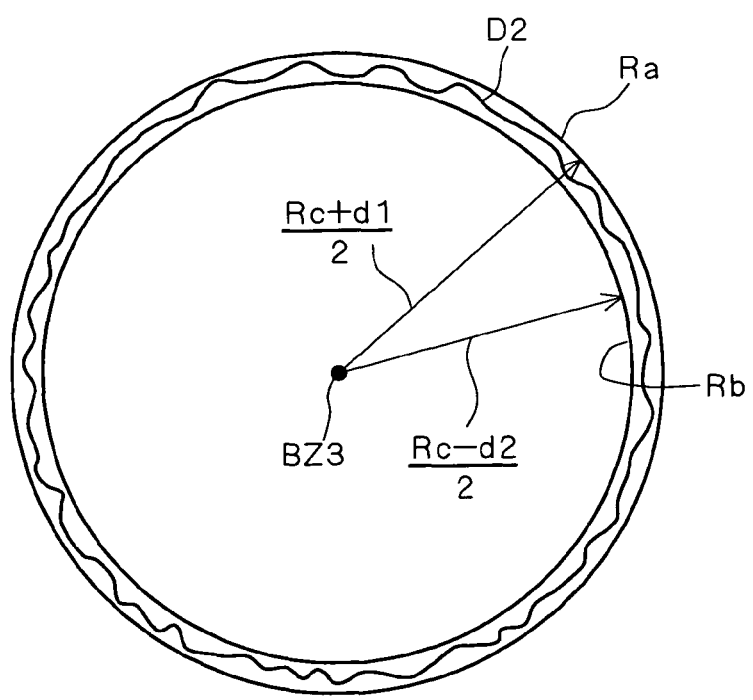
FIG. 12 is a conceptual view showing three-dimensional data obtained by measurement in the second preferred embodiment.

FIG. 12 is a conceptual view showing the three-dimensional data obtained by measurement. FIG. 12 shows points arranged along the cylinder's side surface in one cross section orthogonal to the central axis BZ3 of the cylinder. The similar three-dimensional data is obtained in other cross sections.

In FIG. 12, a circle Ra with a radius ((Rc+d1)/2) and a circle Rb with a radius ((Rc−d2)/2) are shown. Here, d1 represents the value of positive tolerance (absolute value), whereas d2 represents the value of negative tolerance (absolute value). Both of the centers of the circles Ra and Rb coincide an the intersection point of each cross section and the central axis BZ3. A solid line D2 shows the acquired three-dimensional data of the cylinder's side surface Sc. In FIG. 12, differences of positions in the direction of the radius of the cylinder's side surface Sc are exaggeratedly shown.

When it is determined that each point on the cylinder's side surface Sc in one cross section exists between the circles Ra and Rb, based on the calculation results regarding three-dimensional coordinate values of each point, the inspection part 37 of the controller 30 judges this cross section as being acceptable. The same process is repeated and when all cross sections are judged as being acceptable, the cylinder's side diameter Rc is judged as being acceptable.

In the second preferred embodiment, based on the annotation information Rc contained in the three-dimensional CAD data, a primitive (cylinder's side surface Sc) of a target object for measurement is specified (step SP2). The position and posture of the camera 11 are automatically decided such that a part of the target object for measurement corresponding to the specified primitive is set as a target region for image capture (step SP3). Thus the position and posture at the time of measurement can be easily decided to enhance the operability in the three-dimensional measurement.

Third Preferred Embodiment

In a third preferred embodiment of the present invention, the diameter of a hole is inspected. More specifically, using the three-dimensional coordinate values of each point on a plane into which a hole is bored, it is determined whether the bored hole has a diameter conforming to a predetermined condition.

A three-dimensional measurement system of the third preferred embodiment is substantially the same in configuration and the like as the three-dimensional measurement system of the first preferred embodiment. In the following, differences from the first preferred embodiment will be mainly discussed.

Figure 13:
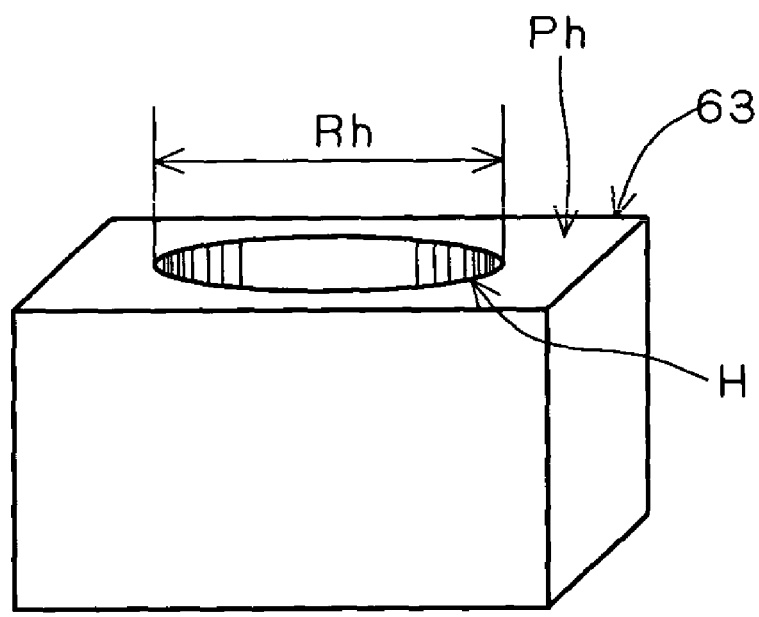
FIG. 13 shows a member as a target object for inspection in a third preferred embodiment of the present invention.

FIG. 13 shows a member 63 as a target object for inspection of the third preferred embodiment. FIG. 14 shows annotation information related to the member 63 that is entered at the design stage.

The annotation information shown in FIG. 14 indicates "Rh" as the name of annotation information, "diameter of a hole" as the type, "plane Ph" as the first element, "none" as the second element, "20" as the design value (mm), "+0.2" as the positive tolerance (mm), and "0" as the negative tolerance (mm). That is, it is seen that the annotation information shown in FIG. 14 relates to the diameter of a hole bored in the plane Ph, while indicating that the design value of this diameter is 20 mm within tolerances of +0.2 and −0 mm.

Next, the operation in the third preferred embodiment will be discussed also referring to the flow chart of FIG. 3.

First, in step SP1 (FIG. 3), the retrieval part 33 of the controller 30 retrieves the annotation information related to a target object for measurement from the three-dimensional CAD data. Here, the annotation information Rh shown in FIG. 14 is acquired to determine that the diameter Rh of a hole bored in the plane Ph is a target object for inspection.

Next, in step SP2, the specification part 34 of the controller 30 specifies a primitive of the target object for measurement on the basis of the annotation information Rh. With reference to FIG. 14, the annotation information Rh includes one primitive, which is specifically the plane Ph with a hole. This plane Ph is specified as a primitive.

In step SP3, the controller 30 decides the position and posture of the camera 11 such that the camera 11 is allowed to perform image capture with a part of the target object for measurement corresponding to the specified primitive coming within the screen. In the following, it is assumed that the diameter of a hole bored in the plane Ph is measured by capturing an image of the plane Ph from above.

Figure 15:
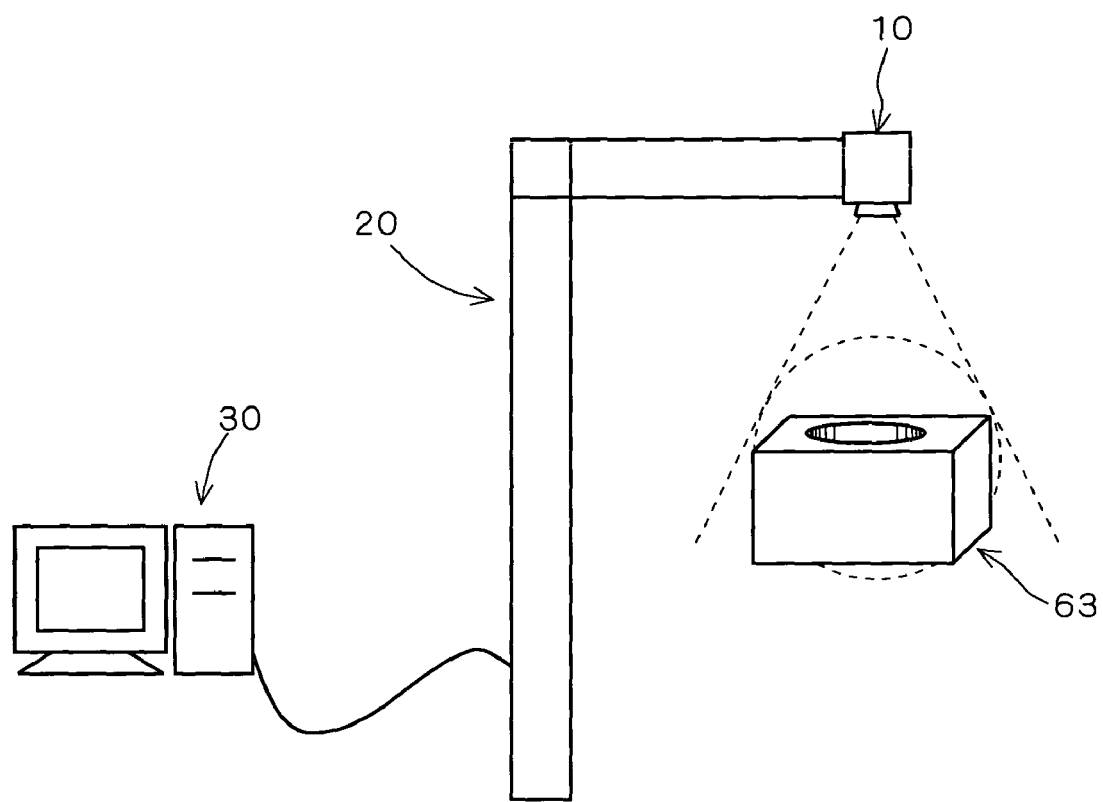
FIGS. 15 and 16 are conceptual views each showing how the position and posture of the camera are decided in the third preferred embodiment.
Figure 16:
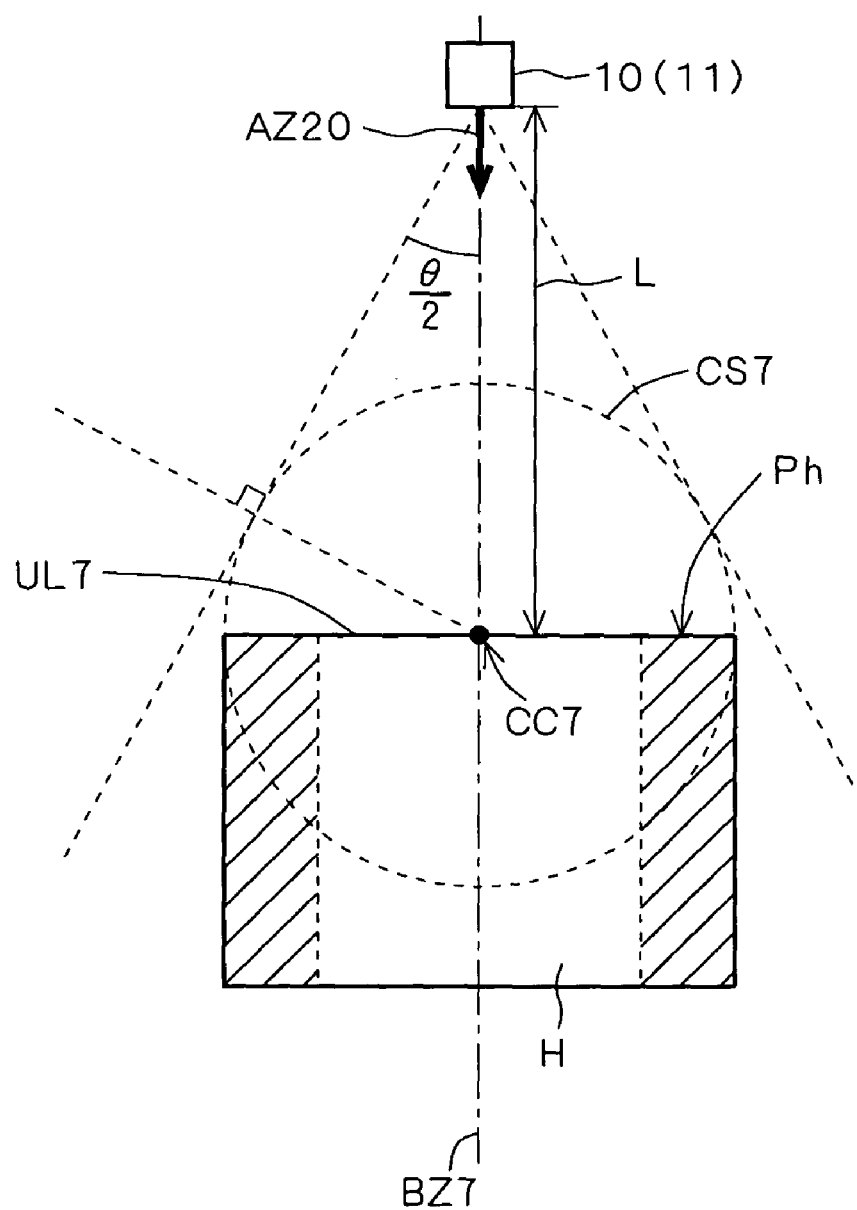

FIGS. 15 and 16 are conceptual views showing how the position and posture of the camera 11 are decided. Here, it is assumed that the upper and bottom surfaces of the member 63 (which is a target object for measurement) are fixedly held in parallel with the floor as illustrated in FIG. 15. FIG. 16 is a side view illustrating the member 63 placed in this condition.

Assuming an inclusive sphere CS7 covering the plane Ph (more specifically, a reference line segment UL7 of the plane Ph), the decision part 35 of the controller 30 decides the position and posture of the camera 11 such that the inclusive sphere CS7 comes within the field of view. The inclusive sphere CS7 is a virtual sphere having a center coinciding with a center (centroid) CC7 of the plane Ph, with a diameter corresponding to a dimension of the plane Ph in a predetermined direction (that is equivalent to the dimension of one side of the plane Ph in the shape of a square). The inclusive sphere CS7 is also expressed as a sphere covering the reference line segment UL7 having a dimension of the plane Ph in a predetermined direction. The center CC7 is also an intersection point of a central axis BZ7 of the hole and the plane Ph.

The position and posture of the camera 11 are decided as follows. The posture of the camera 11 is decided such that a view axis AZ20 of the camera 11 is directed toward the center CC7 of the inclusive sphere CS7. The position of the camera 11 is decided such that a distance L between the camera 11 and the center of the inclusive sphere CS7 satisfies the following formula:

$$L = r/\sin(\theta/2)$$

where $\theta$ is the angle of view of the camera 11, and r is the radius of the inclusive sphere CS7.

A subsequent step is measurement and the like in the position and posture thereby decided. More specifically, the drive arm 20 is driven to realize the position and posture shown in FIG. 16, and thereafter three-dimensional measurement is performed by the measurement unit 10 (step SP4). Thereafter the measurement unit 10 calculates three-dimensional coordinate values on the surface of the target object for measurement according to the light sectioning method. Then the controller 30 translates the three-dimensional coordinate values sent from the measurement unit 10 from the camera coordinate system to the base coordinate system, and stores the transformed three-dimensional coordinate values (step SP5).

When it is determined that the measurement regarding this primitive (namely, the plane Ph) is completed (steps SP6 and SP7), the flow proceeds to step SP8 to perform inspection.

The inspection in step SP8 uses the data included in the annotation information, which is more particularly the data related to the design value and the tolerances.

The inspection of the diameter of the hole is performed in the same way as in the above-described inspection of the cylinder's diameter. However, the third preferred embodiment is intended to inspect the diameter of the hole bored in one plane Ph, whereas in the inspection of the cylinder's diameter, a plurality of cross sections are subjected to the inspection.

In the third preferred embodiment, based on the annotation information Rh contained in the three-dimensional CAD data, a primitive (the plane Ph with a hole) of a target object for measurement is specified (step SP2). The position and posture of the camera 11 are automatically decided such that a part of the target object for measurement corresponding to the specified primitive is set as a target region for image capture (step SP3). Thus the position and posture at the time of measurement can be easily decided to enhance the operability in the three-dimensional measurement.

Fourth Preferred Embodiment

In fourth and fifth preferred embodiments of the present invention, the dimension of a target part for inspection is inspected using data related to the target part for inspection selected from measurement data. This enables data intended for use in the inspection to be automatically determined to easily realize inspection by means of three-dimensional measurement. In the fourth and fifth preferred embodiments, measurement data related to a target object for measurement is not necessarily obtained in the same manner as in the above-described first, second and third preferred embodiments, but may be obtained using an arbitrary technique.

Like in the first preferred embodiment, the three-dimensional measurement system 1 (also identified as 1D) of the fourth preferred embodiment comprises the measurement unit 10, the drive arm 20 and the controller 30 (see FIG. 1).

Figure 17:
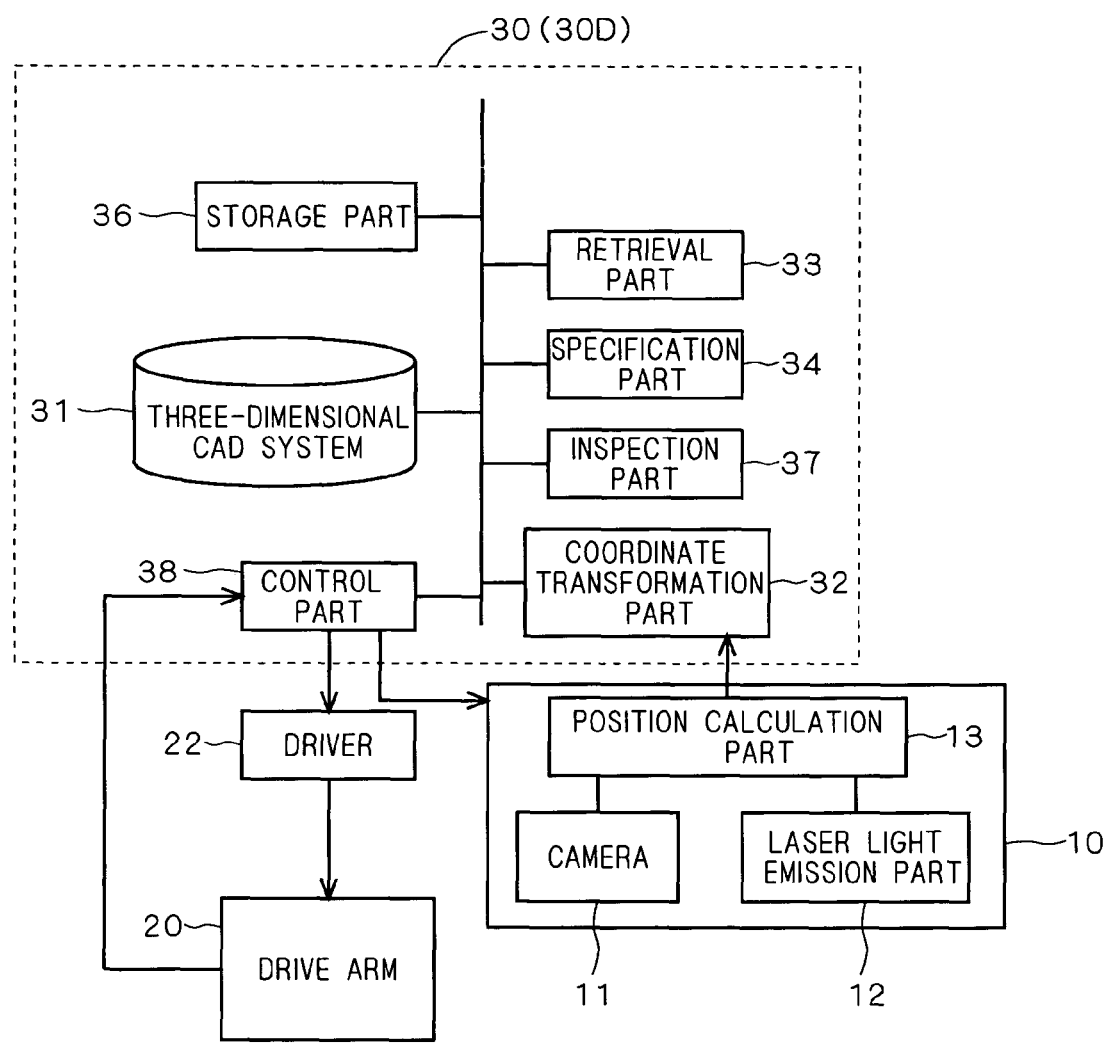
FIG. 17 shows a functional block of a controller in a fourth preferred embodiment of the present invention.

FIG. 17 shows a functional block of the controller 30 (also identified as 30D) of the three-dimensional measurement system 1D. With reference to FIG. 17, the controller 30D comprises the three-dimensional CAD system 31, coordinate transformation part 32, retrieval part 33, specification part 34, storage part 36, inspection part 37 and control part 38.

In the fourth preferred embodiment, the specification part 34 of the controller 30 specifies a primitive of a target object for measurement on the basis of annotation information (discussed later) included in the CAD data. Using data corresponding to the specified primitive that is selected from the measured three-dimensional data related to the target object for measurement (measurement data), the inspection part 37 inspects the dimensions of the target object for measurement. The annotation information related to the target object for measurement is retrieved from the CAD data by the retrieval part 33.

Next, it will be discussed in detail how a target object for measurement is inspected. In the following, it is assumed that the cylindrical member 61 (see FIG. 5) as a target object for measurement is subjected to the measurement of three-dimensional data to determine the acceptability of the member 61.

<Operation>

Figure 18:
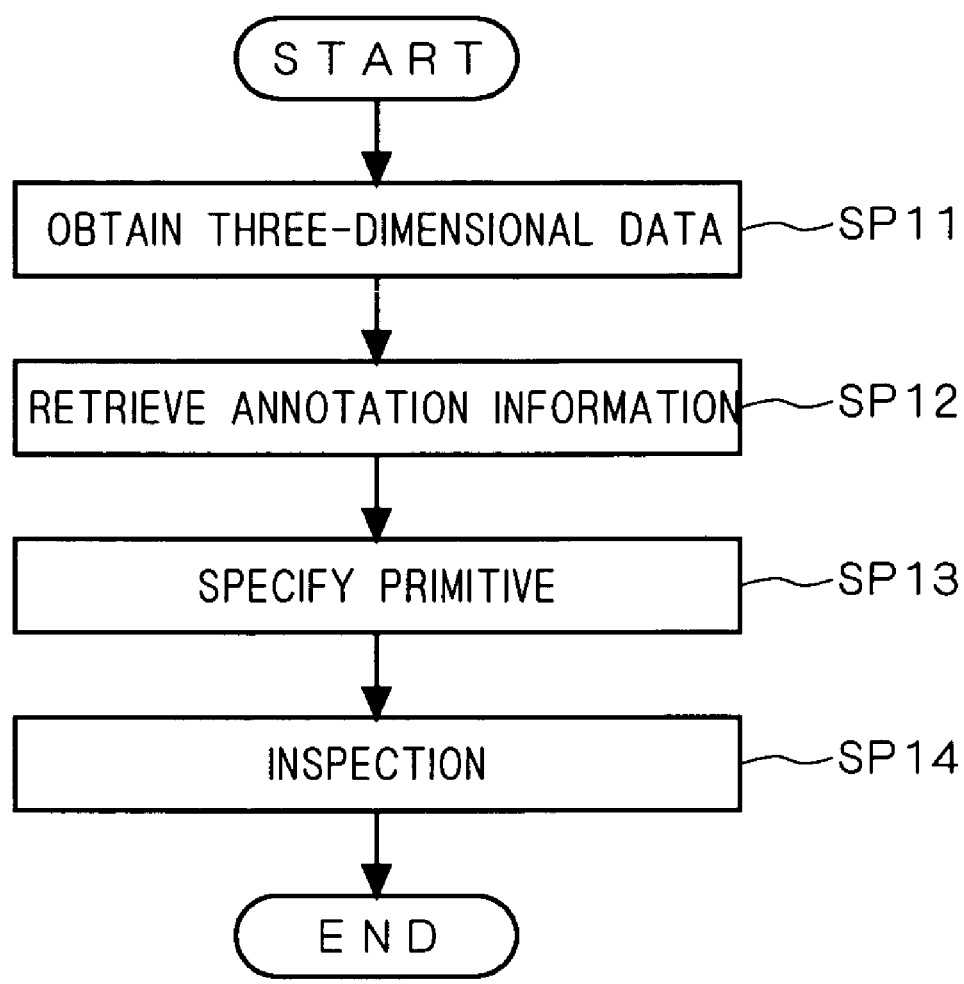
FIG. 18 is another flow chart showing how a target object for measurement is inspected.

FIG. 18 is a flow chart showing how a target object for measurement is inspected.

In step SP11, the member 61 as a target object for measurement is fixedly arranged at a suitable position in the three-dimensional measurement system 1 by a certain holding member (not shown). An instruction given by an operator through the above-discussed operation part 6 and the like triggers measurement using the measurement unit 10 and the like. The controller 30 acquires three-dimensional data on the basis of information given from the measurement unit 10.

More specifically, after the measurement unit 10 is displaced to a target position by the drive arm 20, laser light emitted from the laser light emission part 12 is applied to a target object for measurement. The light reflected therefrom is received at the camera 11 so that the camera 11 captures an image of the target object for measurement. Thereafter the measurement unit 10 calculates three-dimensional coordinate values on the surface of the target object for measurement according to the light sectioning method. The calculated three-dimensional coordinate values are sent to the controller 30, at which the coordinate transformation part 32 translates the three-dimensional coordinate values from the camera coordinate system to the base coordinate system. The coordinate values transformed into the base coordinate system are stored in the storage part 36 of the controller 30. The measurement unit 10 repeatedly performs image capture in different measurement positions and postures, whereby the controller 30 acquires three-dimensional data related to three-dimensional coordinate values on the entire surface of the member 61.

For accurate measurement, calibration is preferably performed prior to step SP11 to obtain the correspondence between the arrangement of the target object for measurement and the three-dimensional CAD data. Here, pre-image capture is performed prior to step SP11 to adjust the actual arrangement of the target object for measurement to the coordinate system in the three-dimensional CAD data, whereby the position and posture of the target object for measurement are in conformity with predetermined position and posture in the CAD data. At this time, the actual positioning of the target object is not required. It is required only to obtain the correspondence between the arrangement of the target object for measurement and the three-dimensional CAD data. As a result of such calibration (establishment of a correlation between the coordinate systems), the three-dimensional measurement system 1 is allowed to more accurately understand the arrangement of the target object for measurement on the basis of the three-dimensional CAD data.

In the fourth preferred embodiment, the controller 30 uses "annotation information" (see FIG. 4) to automatically extract data related to a target part for inspection from all data related to the target object for measurement.

In subsequent step SP12 (FIG. 18), the retrieval part 33 of the controller 30 retrieves the annotation information related to the target object for measurement from the three-dimensional CAD data. Thereafter inspection is performed (step SP14) on the basis of the annotation information thereby retrieved. That is, it is determined by this retrieval what is to be inspected. Here, it is assumed that the annotation information shown in FIG. 4 is retrieved to decide that the surface-to-surface distance S between the planes Pa and Pb is inspected.

In step SP13, the specification part 34 of the controller 30 specifies a primitive (basic structure) of the target object for measurement on the basis of the annotation information S.

With reference to FIGS. 4 and 5, the annotation information S includes two primitives, which are specifically the plane (upper surface) Pa and the plane (bottom surface) Pb of the member 61. Here, these two primitives Pa and Pb are specified as target parts for inspection.

Thereafter in step SP14, using the measurement data related to the primitives Pa and Pb specified in step SP13, the controller 30 performs inspection on the dimensions of the target object for measurement. This inspection uses the data included in the annotation information, which is more particularly the data related to the design value and the tolerances.

Figure 19:
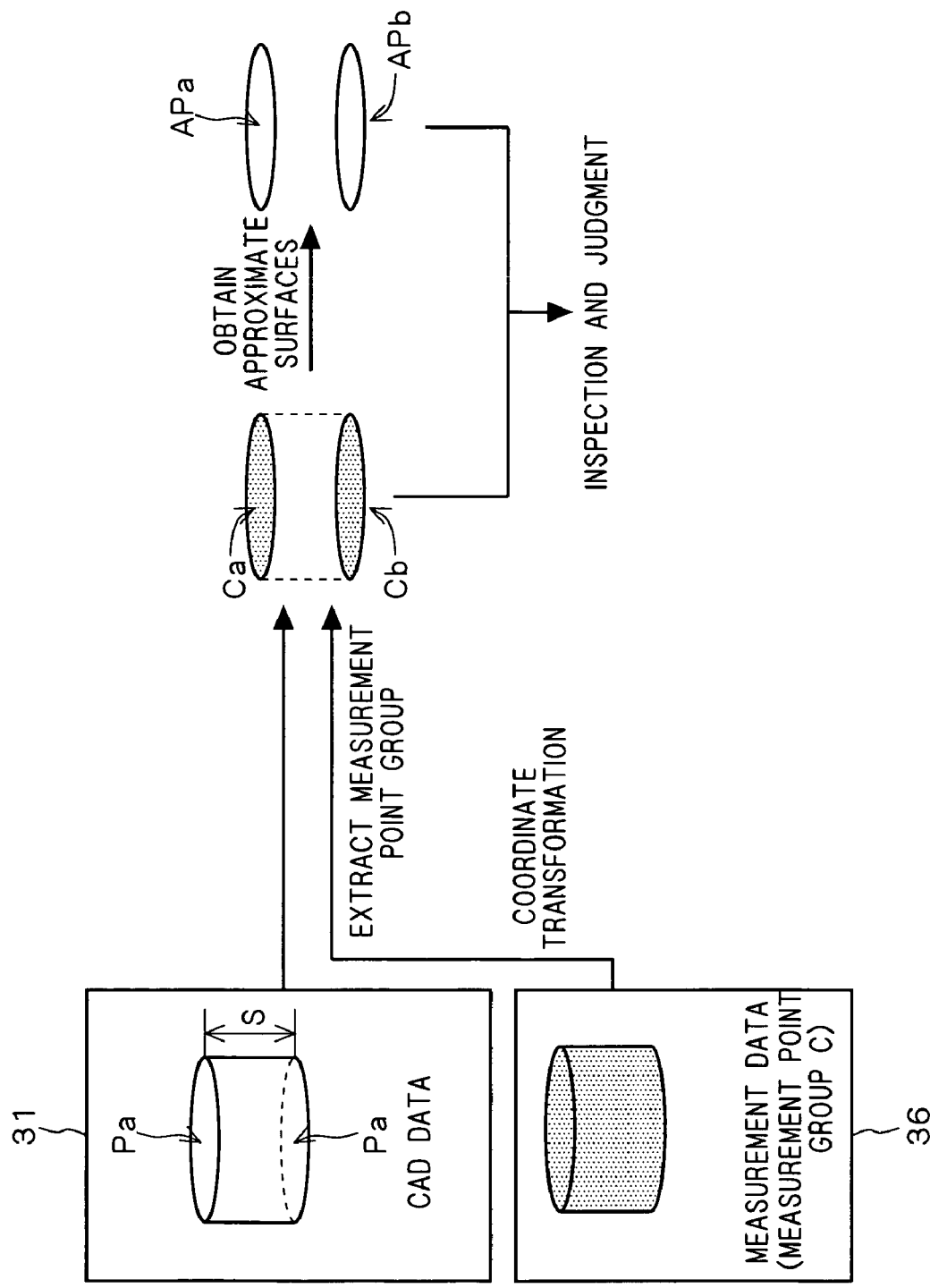
FIG. 19 is a conceptual view schematically showing inspection in the fourth preferred embodiment.
Figure 20:
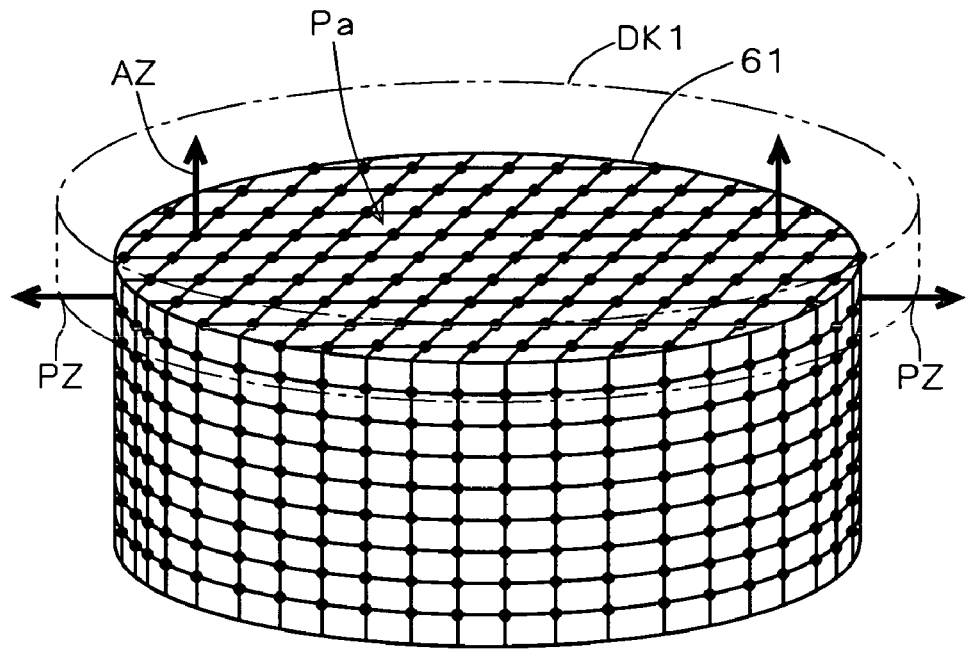
FIG. 20 is a conceptual and perspective view of measurement data in the fourth preferred embodiment.
Figure 21:
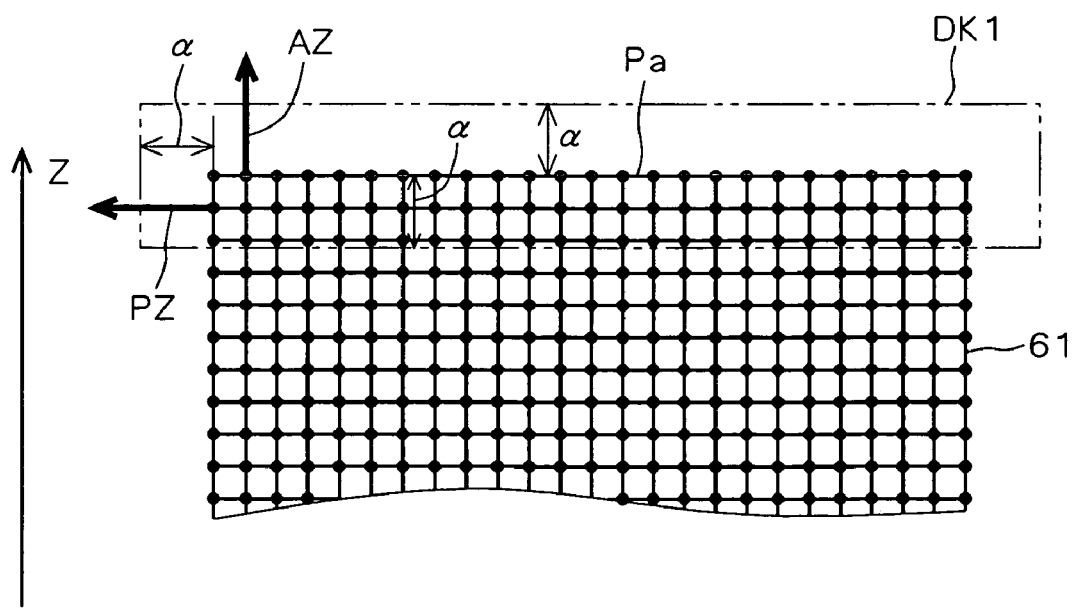
FIG. 21 is a conceptual and side view of the measurement data in the fourth preferred embodiment.

FIG. 19 is a conceptual view schematically showing the inspection. FIGS. 20 and 21 are perspective and side views each conceptually showing the three-dimensional data obtained by measurement. With reference to FIGS. 19, 20 and 21, the inspection at step SP14 will be discussed in more detail. For the sake of simplicity of illustration, lattice points are shown to be relatively widely spaced in FIG. 20. However, lattice points are actually spaced at minute intervals, so that three-dimensional data can be obtained with a high degree of accuracy. This also applies to other drawings.

With reference to FIGS. 19 and 20, the measurement data related to the entire surface of the member 61 (a measurement point group C) is stored in the storage part 36, of which measurement data required for the inspection of the surface-to-surface distance S concerns the two primitives Pa and Pb. In the fourth preferred embodiment, the measurement data related only to the two primitives Pa and Pb specified in step SP13 is extracted.

Next, it will be discussed in detail how the measurement data related to the upper surface Pa is extracted.

First, based on the three-dimensional CAD data, the controller 30 defines measurement data, that is obtained at measurement points in the vicinity of an ideal position of the upper surface Pa and selected from all the measurement points in the measurement point group C, as a candidate for measurement data for the upper surface Pa. More specifically, assuming a thin columnar region DK1 covering the circular surface Pa (see FIG. 21), measurement data obtained at measurement points in the columnar region DK1 is selected as the candidate for the measurement data for the upper surface Pa. The measurement points thereby selected are considered to exist on the upper surface Pa. The upper and bottom surfaces of the columnar region DK1 are arranged in parallel, while each being spaced from the plane Pa by a distance $\alpha$. The surface of the columnar region DK1 has a diameter greater than the diameter of the circular plane Pa by $2\times\alpha$. The value of $\alpha$ is suitably determined within a range of about a few percent of the diameter of the plane Pa, for example.

Thus it is possible to exclude measurement data obtained at a point far away from the upper surface Pa from the candidate for the measurement data for the upper surface Pa.

Next, the controller 30 obtains a normal vector at each measurement point in the columnar region DK1. A normal vector AZ on the upper surface Pa is directed upward in FIG. 21 (in the +Z direction). When the direction of a normal vector at some measurement point is substantially the same as the direction of the normal vector AZ (in the +Z direction), this measurement point is judged as existing on the plane Pa. When the direction of a normal vector (such as PZ) at some measurement point is significantly different from the direction of the normal vector AZ (in the +Z direction), on the other hand, this measurement point is judged as being excluded from the plane Pa. Then a measurement point group Ca (FIG. 19) is obtained from which points on the side surface of the cylinder in the vicinity of its edge are excluded.

Then the measurement point group Ca corresponding to the upper surface Pa is extracted. According to such extraction of the measurement point group Ca, a contour can be precisely extracted by using the CAD data related to the primitive and the information about normal vectors at the surface given from the measurement data.

Likewise, a measurement point group Cb corresponding to the bottom surface Pb is extracted.

Figure 22:
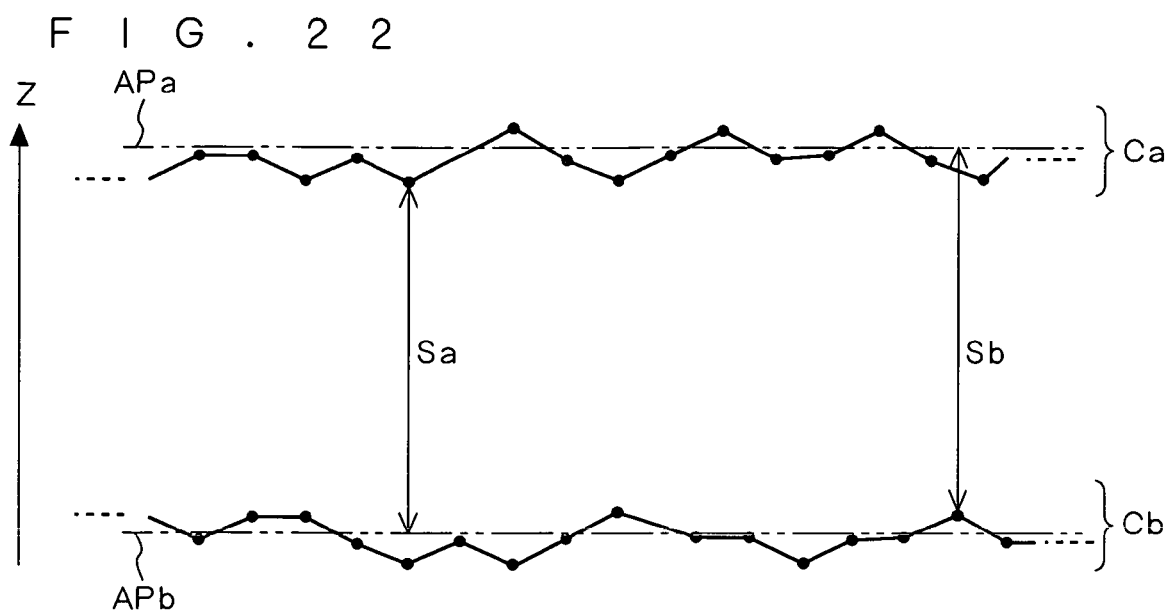
FIG. 22 is a conceptual view of the measurement data in the fourth preferred embodiment.

FIG. 22 is a conceptual view showing the three-dimensional data obtained by measurement. FIG. 22 shows relative positions of the measurement point group Ca on the upper surface Pa and the measurement point group Cb on the bottom surface Pb in relation to one another. The vertical direction defined in FIG. 22 corresponds to the direction of a Z axis (the direction of height of the cylinder). In FIG. 22, the differences in Z coordinate between the measurement points in the measurement point groups Ca and Cb are exaggeratedly shown.

The inspection part 37 of the controller 30 performs inspection using the measurement point group Ca on the upper surface Pa and the measurement point group Cb on the bottom surface Pb. More specifically, on the basis of the measurement point groups Ca and Cb, an approximate surface APa of the plane Pa and an approximate surface APb of the plane Pb are respectively obtained (see FIGS. 19 and 22). Next, a distance Sa between each point belonging to the measurement point group Ca and the approximate surface APb opposed thereto, and a distance Sb between each point belonging to the measurement point group Cb and the approximate surface APa opposed thereto are obtained. When it is determined that the distance Sa obtained at each point of the measurement point group Ca falls within the tolerances of the design value, and that the distance Sb obtained at each point of the measurement point group Cb falls within the tolerances of the design value, the surface-to-surface distance S of the member 61 is judged to be in conformity with the instructions at the design stage. More specifically, when the distances Sa and Sb each fall within the range of not less than (100.0−0.5) and not more than (100.0+0.5), the member 61 is judged as being acceptable.

The surface-to-surface distance S between the upper surface Pa and the bottom surface Pb is thereby inspected. The fourth preferred embodiment has been described using approximate surfaces APa and APb for inspection. Alternatively, like in the first preferred embodiment described above, inspection may be performed without using approximate surfaces (see FIG. 7 and the like).

In the fourth preferred embodiment, based on the annotation information S contained in the three-dimensional CAD data, primitives (planes Pa and Pb) of a target object for measurement are specified (step SP13). Using data corresponding to the specified primitives that are selected from the acquired three-dimensional data related to the target object for measurement (measurement data), the dimensions of the target object for measurement are inspected (step SP14). Thus it is allowed to automatically determine which data is to be adapted for use in inspection to easily realize the inspection by means of three-dimensional measurement.

The tolerance information included in the annotation information is used for inspecting the dimensions of a target object for measurement, to thereby facilitate automatic inspection.

The annotation information S related to a target object for measurement is automatically retrieved from the CAD data by the controller 30, thereby still promoting automatic inspection.

Fifth Preferred Embodiment

In a fifth preferred embodiment of the present invention, the diameter of a hole is inspected. More specifically, using the three-dimensional coordinate values of each point on a plane into which a hole is bored, it is determined whether the bored hole has a diameter conforming to a predetermined condition. The fifth preferred embodiment uses the member 63 (see FIG. 13) as a target object for inspection and the annotation information (see FIG. 14) that are also applied for use in the inspection in the third preferred embodiment.

A three-dimensional measurement system of the fifth preferred embodiment is substantially the same in configuration and the like as the three-dimensional measurement system of the fourth preferred embodiment. In the following, differences from the fourth preferred embodiment will be mainly discussed.

The operation in the fifth preferred embodiment will be discussed also referring to the flow chart of FIG. 18.

First, the member 63 as a target object for inspection is subjected to three-dimensional measurement using the measurement unit 10 and the like in step SP11. Then the controller 30 acquires three-dimensional data on the basis of the information given from the measurement unit 10.

Next, the retrieval part 33 of the controller 30 retrieves the annotation information related to the target object for measurement from the three-dimensional CAD data in step SP12 (FIG. 18). Here, the annotation information Rh shown in FIG. 14 is acquired to determine that the diameter of a hole bored in the plane Ph is inspected.

In step SP13, the specification part 34 of the controller 30 specifies a primitive (basic structure) of the target object for measurement on the basis of the annotation information Rh.

With reference to FIG. 13, the annotation information Rh includes one primitive, which is specifically the plane Ph. Here, the primitive Ph is specified as a target part for inspection.

Thereafter in step SP14, using the measurement data related to the primitive Ph specified in step SP13, the controller 30 performs inspection on the dimensions of the target object for measurement. This inspection uses the data included in the annotation information, which is more particularly the data related to the design value and tolerances.

Figure 23:
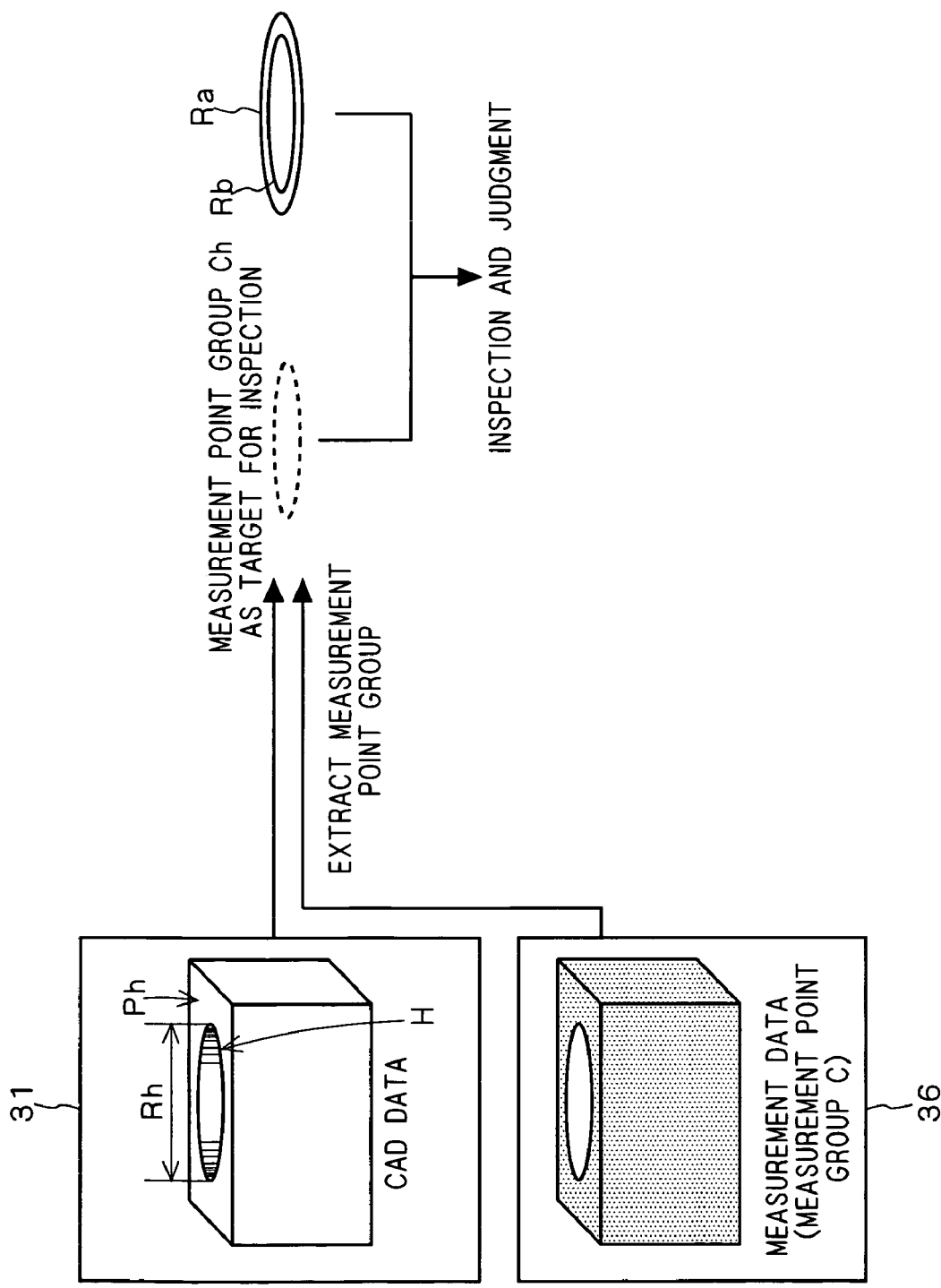
FIG. 23 is a conceptual view schematically showing inspection in a fifth preferred embodiment of the present invention.
Figure 24:
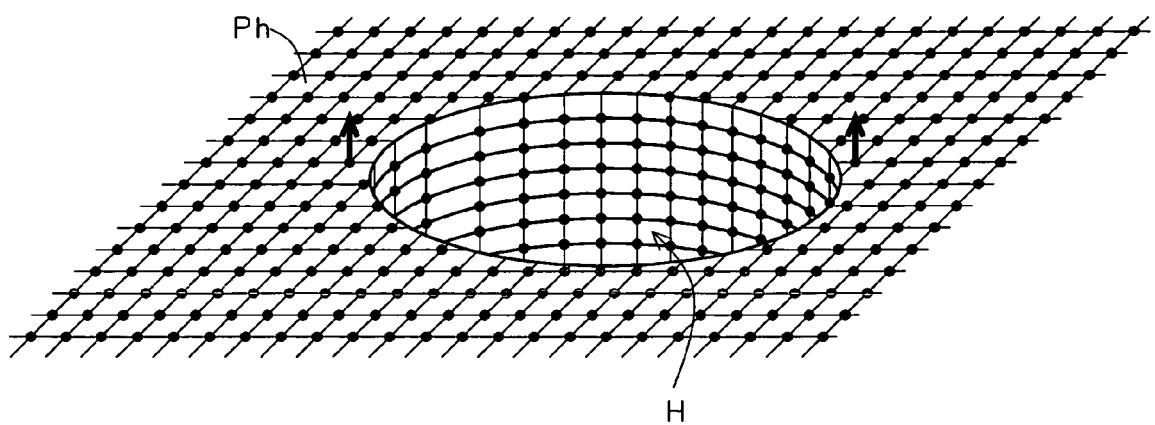
FIG. 24 is a conceptual and perspective view of measurement data in the fifth preferred embodiment.
Figure 25:
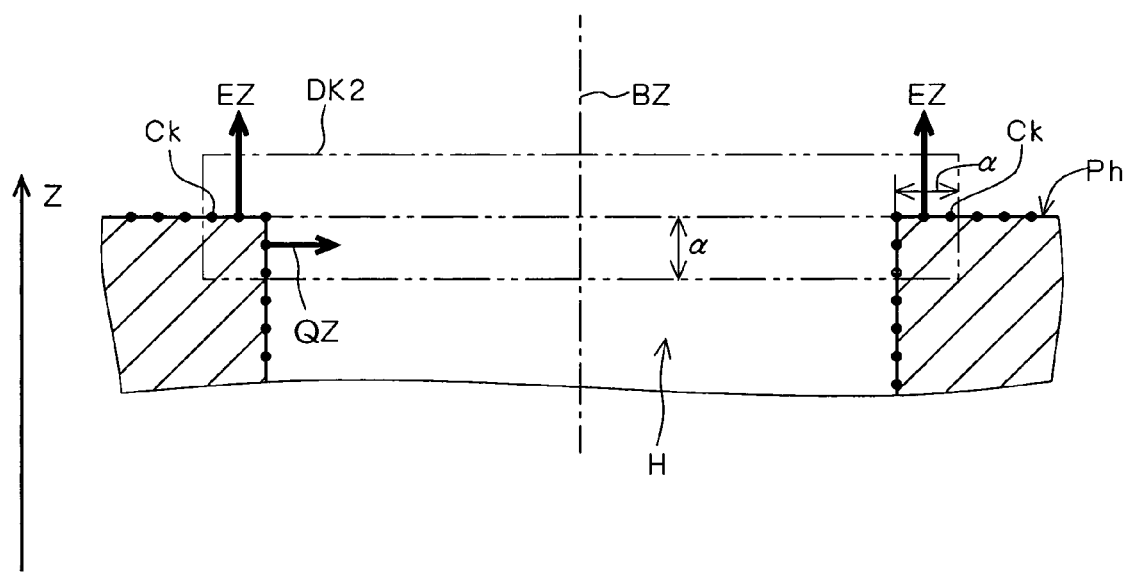
FIG. 25 is a conceptual and side view of the measurement data in the fifth preferred embodiment.
Figure 26:
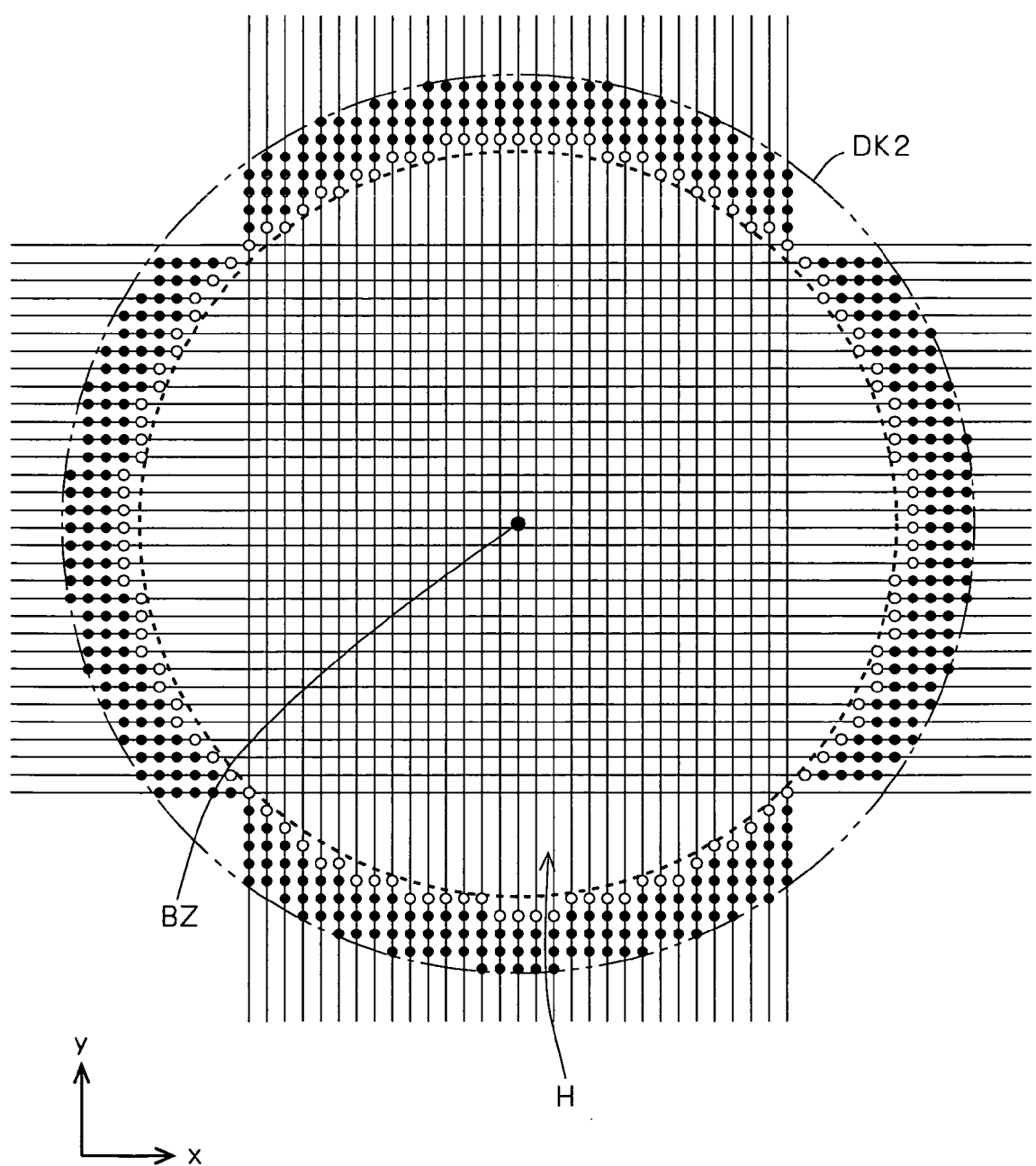
FIGS. 26 and 27 are conceptual and top views each showing the measurement data in the fifth preferred embodiment.

FIG. 23 is a conceptual view schematically showing the inspection. FIGS. 24, 25 and 26 are a perspective view, a side view and a top view each conceptually showing the three-dimensional data obtained by measurement. With reference to these figures, the inspection will be discussed in more detail.

With reference to FIGS. 23 and 24, the measurement data related to the entire surface of the member 63 (three-dimensional data) is stored in the storage part 36. Of all the above data, only measurement data concerning the primitive Ph is required for the inspection of the diameter Rh of the hole H bored in the plane Ph. In the fifth preferred embodiment, only measurement data obtained at each measurement point in the primitive Ph specified in step SP13 is extracted from the measurement point group C. Further, the measurement data related to the edge of the hole H is extracted from the measurement data related to the primitive Ph.

Next, it will be discussed in detail how the measurement data related to the hole H is extracted.

First, based on the three-dimensional CAD data, the controller 30 defines measurement data, that is obtained at measurement points in the vicinity of an ideal position of the edge of the hole H, as a candidate for measurement data for the plane Ph. More specifically, assuming a columnar region DK2 including points on the plane Ph and surrounding the hole H (see FIG. 25), measurement data obtained at each measurement point in the columnar region DK2 is selected as the candidate for the measurement data for the plane Ph. The columnar region DK2 is coaxial with the hole H with respect to a central axis BZ. The upper and bottom surfaces of the columnar region DK2 are arranged in parallel, while each being spaced from the plane Ph as a reference plane by a distance $\alpha$. The surface of the columnar region DK2 has a diameter greater than the diameter of the hole H by $2 \times \alpha$. The value of $\alpha$ is suitably determined within a range of about a few percent of the diameter of the hole H, for example.

Thus it is possible to exclude measurement data obtained at a point far away from the hole H from the candidate for the measurement data for the hole H.

Next, based on the three-dimensional CAD data, the controller 30 obtains a normal vector at each measurement point assumed to be located in the vicinity of the edge of the hole H (namely, each measurement point in the columnar region DK2). A normal vector EZ on the plane Ph is directed upward in FIG. 25 (in +Z the direction). When the direction of a normal vector at some measurement point is substantially the same as the direction of the normal vector EZ (in +Z the direction), this measurement point is judged as existing on the plane Ph. When the direction of a normal vector (such as QZ) at some measurement point is significantly different from the direction of the normal vector EZ (in +Z the direction), on the other hand, this measurement point is judged as being excluded from the plane Ph. Then a measurement point group Ck is obtained that is formed by excluding points on the inner side surface of the hole H near its edge from various measurement points in the columnar region DK2.

The controller 30 also selects a measurement point group Ch corresponding to the edge of the hole H from the measurement point group Ck belonging to the plane Ph. More specifically, with reference to FIG. 26, with respect to each line of measurement points arranged in a predetermined direction (in the Y direction, for example), two points closest to the center of the hole H (represented by white circles in FIG. 26) are selected as points corresponding to the edge from the measurement point group Ck. This selection is repeatedly performed upon several lines to define the measurement point group Ch. According to this selection, a group of points near the central axis BZ is regarded as the measurement point group Ch corresponding to the edge of the hole H. With reference to FIG. 26, with respect to measuring points which exist relatively far away from the center of the hole H in a direction (in the X direction, for example) perpendicular to the above-discussed predetermined direction (Y direction, for example), in each line of measurement points arranged in the direction (in the X direction, for example) perpendicular to the above-discussed predetermined direction (Y direction, for example), two points closest to the center of the hole H are preferably selected as points corresponding to the edge from the measurement point group Ck.

The measurement point group Ch is thereby selected.

Figure 27:
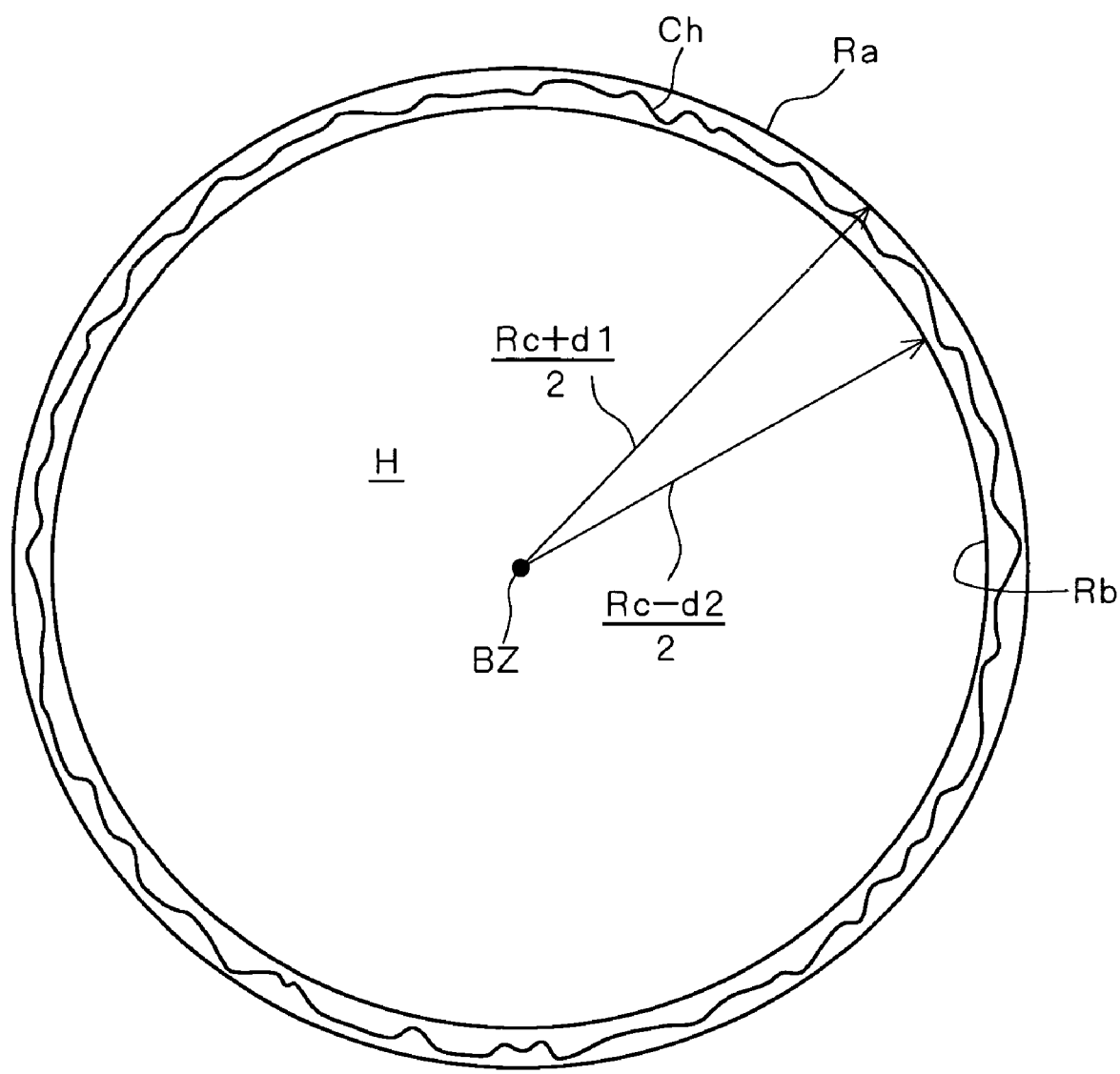

FIG. 27 is a conceptual view showing the three-dimensional data obtained by measurement. FIG. 27 shows the measurement point group Ch corresponding to the edge of the hole H.

In FIG. 27, a circle Ra with a radius ((Rc+d1)/2) and a circle Rb with a radius ((Rc−d2)/2) are shown. Here, d1 represents the value of positive tolerance (absolute value), whereas d2 represents the value of negative tolerance (absolute value). Both of the centers of the circles Ra and Rb coincide with the center of the hole H. In FIG. 27, differences of positions in the direction of the diameter of the hole H are exaggeratedly shown.

When all points belonging to the measurement point group Ch exist between the circles Ra and Rb, the inspection part 37 of the controller 30 judges the hole H as being acceptable.

As discussed, based on the annotation information Rh contained in the three-dimensional CAD data, a primitive (plane Ph) of a target object for measurement is specified (step SP13). Using data corresponding to the specified primitive that is selected from the acquired three-dimensional data related to the target object for measurement, the dimensions of the target object for measurement are inspected (step SP14). Thus it is allowed to automatically determine which data is to be adapted for use in inspection to easily realize the inspection by means of three-dimensional measurement.

<Modifications>

The present invention is not limited to the preferred embodiments described above.

As an example, in each of the preferred embodiments described above, the three-dimensional CAD data contains a single piece of annotation information. Alternatively, the three-dimensional CAD data may contain several pieces of annotation information. In this case, the flow of processes from step SP1 to SP8 (or from step SP11 to SP14) is repeatedly performed upon second and subsequent pieces of annotation information.

In each of the preferred embodiments described above, the controller 30 automatically retrieves annotation information of a target object for measurement from the three-dimensional CAD data. Alternatively, annotation information related to a target object for measurement may be specified in response to input by a user. More specifically, a certain entry screen is presented on the display part 5 of the controller 30, and a desirable piece of annotation information may be selected as a target object for measurement from several pieces of annotation information displayed on this entry screen.

The way to determine the acceptance of a target member based on various pieces of dimensional information is not limited to that described in each of the foregoing preferred embodiments. By way of example, in the first preferred embodiment, a target member is judged as being acceptable when all the differences Si fall within tolerance limits with respect to a design value. Alternatively, a target member may be judged as being acceptable when the difference between the average value of Z-coordinate values of respective points on the upper surface Pa and the average value of Z-coordinate values of respective points on the bottom surface Pb falls within tolerance limits with respect to a design value. Still alternatively, in the second and third preferred embodiments, for example, assuming a distance Di (not shown) between opposed points relative to a center as a virtual diameter on each horizontal section of the cylinder, a target member may be judged as being acceptable when the distances Di given in all combinations of opposed points fall within tolerance limits with respect to a design value.

In each of the preferred embodiments described above, a target object for measurement is formed by a single member. Alternatively, the measurement of the present invention is also applicable to a target object formed by several members, in which case a target member is selected from the several members to suitably and precisely decide the position and posture for capturing an image of the selected target member. Still alternatively, when a small portion is selected as a target part for measurement from a large member, a primitive is specified using annotation information to suitably and precisely decide the position and posture for capturing an image of this small portion.

In each of the above-described first, second and third preferred embodiments, an inclusive sphere is obtained for a primitive showing isotropy. Alternatively, a primitive with anisotropy may also be subjected to the same processing. More specifically, an aspect ratio R1 (length divided by width) of a primitive (target surface for image capture of the primitive) and an aspect ratio R2 (length divided by width) of the screen of a camera are compared to decide the direction in which a line segment to serve as a reference line segment extends. In more detail, a line segment extending in a horizontal direction is applied as a reference line segment in the case of R1<R2. A line segment extending in a vertical direction is applied as a reference line segment in the case of R1>R2. Then an inclusive sphere is obtained that covers the applied reference line segment of a primitive.

In the above-described fifth preferred embodiment, the information related to the inner wall of the hole H is used to determine the acceptance of a member. When the measurement data related to the plane Ph does not include data of a portion corresponding to the hole H, the following processing may be employed.

More specifically, without using the columnar region DK2 for the selection and without using normal vectors for the exclusion, a group of points may be directly selected from all the measurement points in the measurement point group C as the measurement point group Ch corresponding to the edge of the hole H, in the same manner as in the processing described with reference to FIG. 26. That is, with respect to each line of measurement points in a predetermined direction, two points closest to the center of the hole H are selected. This selection is repeated with respect to a plurality of lines of measurement points, and a group of points thereby selected is regarded as the measurement point group Ch.

Figure 28:
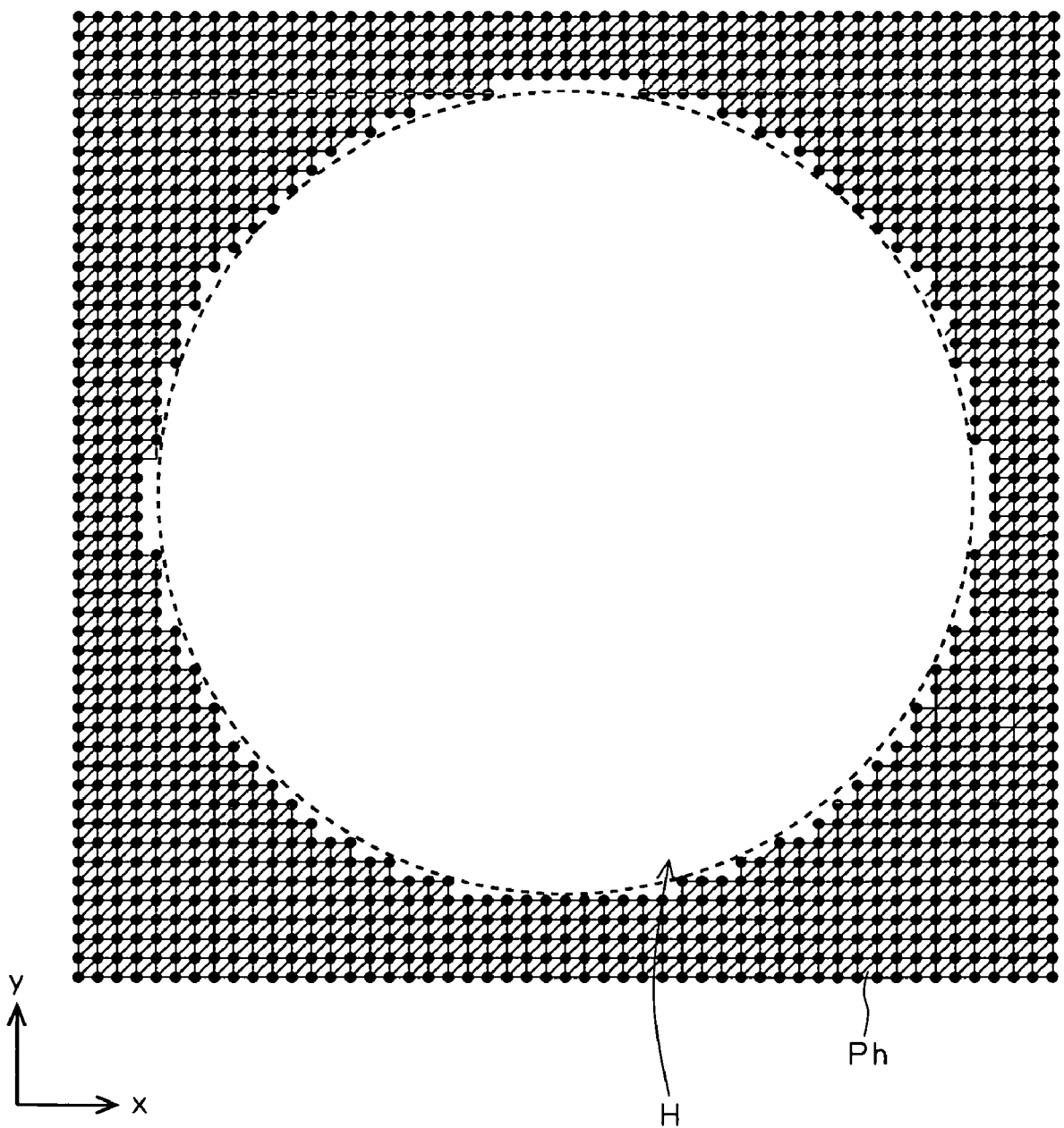
FIG. 28 is a conceptual and top view of measurement data according to a modification.

Alternatively, based on the continuity of polygons in measurement data (three-dimensional data), a group of points may be directly selected, as the measurement point group Ch corresponding to the edge of the hole H, from all the measurement points in the measurement point group C as shown in FIG. 28. More specifically, neighboring measurement points that are selected as effective data from lattice points on the plane Ph are joined together to form polygons. Points in a region including the continuity of these polygons are determined as points on the plane Ph excluding the hole H. A region surrounded by the continuous polygons and in the vicinity of a theoretical center of the hole H is considered as a region corresponding to the hole H. A group of innermost measurement points forming the continuous polygons is considered as the measurement point group Ch corresponding to the edge of the hole H. That is, the measurement point group Ch is extracted based on the CAD data related to the primitive and the continuity of polygons formed by effective measurement points, thereby realizing precise extraction of the edge (contour) of the hole H.

In each of the preferred embodiments described above, three-dimensional coordinate values of a target object for measurement are calculated in advance in the camera coordinate system at the measurement unit 10. These three-dimensional coordinate values are sent to the controller 30 to be transformed to the base coordinate system. Alternatively, three-dimensional coordinate values of a target object for measurement in the camera coordinate system may also be obtained in the controller 30.

In each of the preferred embodiments described above, the drive arm 20 has six degrees of freedom. Alternatively, the drive arm 20 may have seven or more degrees of freedom, or five or less degrees of freedom as required.

While the invention has been shown and described in detail, the foregoing description is in all aspects illustrative and not restrictive. It is therefore understood that numerous modifications and variations can be devised without departing from the scope of the invention.

What is claimed is:

1. A three-dimensional measurement system, comprising:
    a three-dimensional measuring device for obtaining measurement data related to the three-dimensional shape of a target object for measurement;
    a retrieval device for retrieving annotation information from CAD data, the annotation information including at least a type of a measurement, a design value, and a tolerance;
    a specification part for specifying a primitive of said target object based on the annotation information in the CAD data; and
    a controller for controlling said three-dimensional measuring device based on said primitive specified by said specification part,
    wherein said three-dimensional measuring device performs measurement using a camera, and said controller controls the position and posture of said camera such that a part of said target object corresponding to the specified primitive is defined as a target region for image capture.

2. The system according to claim 1, further comprising:
    a designation part for accepting designation of said annotation information related to said target object in response to input by a user.

3. The system according to claim 1, wherein
    said controller controls the position and posture of said camera by using an inclusive sphere that covers a reference line segment having at least a dimension of said specified primitive in a predetermined direction.

4. The system according to claim 3, wherein
said controller controls the position and posture of said camera by using an inclusive sphere that covers a reference line segment having said dimension of said specified primitive in said predetermined direction plus a value for adjustment.

5. The system according to claim 3, wherein
said controller controls the posture of said camera such that the center of said inclusive sphere is set as a center point of view.

6. The system according to claim 5, wherein
said controller controls the posture of said camera such that a normal to said primitive at an intersection point of a view axis of said camera and said primitive is arranged in the same direction as said view axis.

7. The system according to claim 3, wherein
said controller controls the position of said camera such that a distance L between said camera and the center of said inclusive sphere satisfies the following formula:

$$L = r / \sin(\theta/2)$$

where $\theta$ is the angle of view of said camera, and r is the radius of said inclusive sphere.

8. The system according to claim 3, wherein
when said specified primitive has a planar surface, said controller controls the position and posture of said camera such that said inclusive sphere comes within the field of view of said camera.

9. The system according to claim 1, wherein
when said primitive has a non-planar surface, said controller controls the position and posture of said camera to define a part of said non-planar surface as a target region for measurement by one image capture operation, with a normal to said part of said non-planar surface forming an angle of not more than a certain value with a view axis of said camera.

10. The system according to claim 1, wherein
said annotation information includes a distance between upper and bottom surfaces of a cylindrical member, and
said specification part specifies said upper and bottom surfaces of said cylindrical member as primitives.

11. The system according to claim 1, wherein
said annotation information includes the diameter of a cylindrical member, and
said specification part specifies the side surface of said cylindrical member as a primitive.

12. The system according to claim 1, wherein
said annotation information includes the diameter of a hole bored in a plane, and
said specification part specifies said plane as a primitive.

13. A three-dimensional measurement method, comprising the steps of:
retrieving annotation information from CAD data, the annotation information including at least a type of a measurement, a design value, and a tolerance;
specifying a primitive of a target object for measurement based on the annotation information in the CAD data; and
controlling a three-dimensional measuring device based on the specified primitive,
wherein said three-dimensional measuring device performs measurement using a camera, and in said step of controlling said three-dimensional measuring device, the position and posture of said camera are controlled such that a part of said target object corresponding to said specified primitive is defined as a target region for image capture.

14. A computer-readable recording medium storing a program that causes a computer to execute the following steps of:
retrieving annotation information from CAD data, the annotation information including at least a type of a measurement, a design value, and a tolerance;
specifying a primitive of a target object for measurement based on the annotation information in the CAD data; and
controlling a three-dimensional measuring device based on the specified primitive,
wherein said three-dimensional measuring device performs measurement using a camera, and in said step of controlling said three-dimensional measuring device, the position and posture of said camera are controlled such that a part of said target object corresponding to said specified primitive is defined as a target region for image capture.

15. A three-dimensional measurement system, comprising:
a three-dimensional measuring device for obtaining measurement data related to the three-dimensional shape of a target object;
a retrieval device for retrieving annotation information from CAD data, the annotation information including at least a type of a measurement, a design value, and a tolerance;
a specification part for specifying a primitive of said target object based on the annotation information in the CAD data; and
an inspection device for inspecting the dimension of said target object by using data selected from said measurement data and corresponding to said primitive specified by said specification part,
wherein said inspection device inspects the dimension of said target object by using tolerance information included in said annotation information.

16. A method of inspecting a target object for measurement utilizing an inspection device, comprising the steps of:
retrieving annotation information from CAD data, the annotation information including at least a type of a measurement, a design value, and a tolerance;
specifying a primitive of a target object for measurement based on the annotation information in the CAD data; and
inspecting the dimension of said target object by using data selected from measurement data related to the three-dimensional shape of said target object and corresponding to the specified primitive,
wherein said inspection device inspects the dimension of said target object by using tolerance information included in said annotation information.

17. A computer-readable recording medium storing a program that causes a computer to execute the following steps of:
retrieving annotation information from CAD data, the annotation information including at least a type of a measurement, a design value, and a tolerance;
specifying a primitive of a target object for measurement based on the annotation information in the CAD data; and
inspecting the dimension of said target object by using data selected from measurement data related to the three-dimensional shape of said target object and corresponding to the specified primitive,
wherein said inspection of the dimension of said target object is done using tolerance information included in said annotation information.

18. A three-dimensional measurement system, comprising:
- a three-dimensional measuring device having a camera for obtaining measurement data related to the three-dimensional shape of a target object for measurement;
- a retrieval device for retrieving annotation information from CAD data, the annotation information including at least a type of a measurement, a design value, and a tolerance; and
- a controller configured to specify a primitive of said target object based on the annotation information in the CAD data,
- wherein said controller is further configured to use the specified primitive and the field of view of the camera to determine the position and posture of said camera, said position and posture being determined such that the specified primitive is defined as a target region for image capture.

19. A method of obtaining measurement data related to the three-dimensional shape of a target object utilizing a three-dimensional measuring device having a camera, said method comprising the steps of:
- retrieving annotation information from CAD data, the annotation information including at least a type of a measurement, a design value, and a tolerance;
- specifying a primitive of a target object for measurement based on the annotation information in the CAD data; and
- controlling the position and posture of said camera using the specified primitive and the field of view of the camera, said position and posture being determined such that the specified primitive is defined as a target region for image capture.

* * * * *